US010153832B2

(12) United States Patent
Damnjanovic et al.

(10) Patent No.: US 10,153,832 B2
(45) Date of Patent: Dec. 11, 2018

(54) ASYMMETRIC FORWARD LINK AND REVERSE LINK SUBFRAME SPLIT

(71) Applicant: QUALCOMM Incorporated, San Diego, CA (US)

(72) Inventors: Jelena Damnjanovic, Del Mar, CA (US); Fatih Ulupinar, San Diego, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 15/251,810

(22) Filed: Aug. 30, 2016

(65) Prior Publication Data
US 2017/0222713 A1 Aug. 3, 2017

Related U.S. Application Data

(60) Provisional application No. 62/288,286, filed on Jan. 28, 2016.

(51) Int. Cl.
H04B 7/185 (2006.01)
H04L 1/18 (2006.01)
H04W 72/04 (2009.01)
H04W 72/12 (2009.01)
H04L 5/00 (2006.01)

(52) U.S. Cl.
CPC ..... H04B 7/18582 (2013.01); H04B 7/18539 (2013.01); H04L 1/1864 (2013.01); H04L 1/1887 (2013.01); H04L 1/1893 (2013.01); H04L 5/0055 (2013.01); H04W 72/0446 (2013.01); H04W 72/1263 (2013.01); H04L 5/0091 (2013.01)

(58) Field of Classification Search
None
See application file for complete search history.

(56) References Cited

U.S. PATENT DOCUMENTS

| 7,839,834 | B2 | 11/2010 | Horn et al. | |
| 8,670,410 | B2 | 3/2014 | Luo et al. | |
| 9,455,777 | B1* | 9/2016 | Johnson | H04B 7/2041 |
| 2008/0168321 | A1 | 7/2008 | Lim et al. | |
| 2015/0063250 | A1 | 3/2015 | Lahetkangas et al. | |

(Continued)

FOREIGN PATENT DOCUMENTS

| EP | 2549663 A2 | 1/2013 |
| WO | WO-2008100341 A2 | 8/2008 |
| WO | WO-2014110692 A1 | 7/2014 |

OTHER PUBLICATIONS

International Search Report and Written Opinion—PCT/US2016/068983—ISA/EPO—dated Apr. 24, 2017.

Primary Examiner — Christine T Duong
(74) Attorney, Agent, or Firm — Paradice and Li LLP

(57) ABSTRACT

A method and apparatus for operating a satellite access network (SAN) of a satellite communication system to schedule communications with a user terminal. In some aspects, the SAN may provision a communication frame, for the user terminal, into a number of forward-link (FL) subframes and a different number of reverse-link (RL) subframes. The SAN then transmits the FL subframes to the user terminal via a forward link of the satellite communication system, and subsequently receives the RL subframes from the user terminal via a reverse link of the satellite communication system.

42 Claims, 16 Drawing Sheets

(56) References Cited

U.S. PATENT DOCUMENTS

2015/0208421 A1\* 7/2015 Agiwal ............ H04W 36/0072
455/436
2016/0174246 A1 6/2016 Uchino et al.
2017/0093482 A1\* 3/2017 Keshet ............... H04B 7/18513

\* cited by examiner

ASYMMETRIC FORWARD LINK AND REVERSE LINK SUBFRAME SPLIT

CROSS-REFERENCE TO RELATED APPLICATIONS

This application claims priority under 35 USC 119(e) to commonly owned U.S. Provisional Patent Application No. 62/288,286 entitled "ASYMMETRIC FORWARD LINK AND REVERSE LINK SUBFRAME SPLIT" filed on Jan. 28, 2016, the entirety of which is incorporated by reference herein.

INTRODUCTION

Various aspects described herein relate to satellite communications, and more particularly to increasing throughput on a forward-link channel of a satellite communication system.

Conventional satellite-based communication systems include gateways and one or more satellites to relay communication signals between the gateways and one or more user terminals. A gateway is an Earth station having an antenna for transmitting signals to, and receiving signals from, communication satellites. A gateway provides communication links, using satellites, for connecting a user terminal to other user terminals or users of other communication systems, such as a public switched telephone network, the internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of one or more antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and frequency shift in radio signal propagation between a communication transceiver on the Earth and the geosynchronous satellite. However, because geosynchronous satellites are limited to a geosynchronous orbit (GSO), the number of satellites that may be placed in the GSO is limited. As alternatives to geosynchronous satellites, communication systems which utilize a constellation of satellites in non-geosynchronous orbits (NGSO), such as low-earth orbits (LEO), have been devised to provide communication coverage to the entire Earth or at least large parts of the Earth.

Compared to GSO satellite-based and terrestrial communication systems, non-geosynchronous satellite-based systems, such as LEO satellite-based systems, may present several challenges. For example, because LEO satellites move quickly across the sky relative to a given point on the earth's surface, beams transmitted from an LEO satellite may pass relatively quickly across a user terminal (UT). Hybrid automatic repeat request (HARQ) is a method by which a receiving device may request retransmission of data that was received in error. More specifically, HARQ allows for buffering and combining of incorrectly received data (e.g., packets, frames, PDUs, MPDUs, etc.) to potentially reduce the number of retransmissions needed to properly reconstruct a particular unit of data.

Communications between a UT and a satellite access network (e.g., a network of gateways, controllers, and other elements that communicate with the UT via satellite) are typically half-duplex. Thus, only one of the UT or the satellite access network (SAN) may transmit to the other at a given time. Due to this limitation, a communication interval (e.g., cycle) is typically provisioned for a number of forward-link (FL) transmissions (e.g., from the SAN to the UT) and an equal number of reverse-link (RL) transmissions (e.g., from the UT to the SAN). This "symmetric" allocation of FL transmissions and RL transmissions allows for low implementation complexity (e.g., each RL transmission may provide HARQ feedback for a corresponding FL transmission). However, in many satellite communication systems, the amount of FL traffic from the SAN may outweigh the amount of RL traffic from any given UT. Thus, it may be desirable to increase the number of FL transmissions in a communication cycle while maintaining HARQ operations for each of the FL transmissions.

SUMMARY

Aspects of the disclosure are directed to apparatuses and methods for increasing the throughput of forward-link communications in a satellite communication system. In one example, a method of operating a satellite access network (SAN) is disclosed. The method may include provisioning a communication frame, for a user terminal, into a number of forward-link (FL) subframes and a different number of reverse-link (RL) subframes, transmitting the FL subframes to the user terminal via a forward link of the satellite communication system, and receiving the RL subframes from the user terminal via a reverse link of the satellite communication system.

In another example, a satellite access network is disclosed. The SAN may include one or more processors and a memory configured to store instructions. Execution of the instructions by the one or more processors may cause the SAN to provision a communication frame, for a user terminal, into a number of FL subframes and a different number of RL subframes, transmit the FL subframes to the user terminal via a forward link of a satellite communication system, and receive the RL subframes from the user terminal via a reverse link of the satellite communication system.

In another example, a satellite access network is disclosed. The SAN may include means for provisioning a communication frame, for a user terminal, into a number of FL subframes and a different number of RL subframes, means for transmitting the FL subframes to the user terminal via a forward link of a satellite communication system, and means for receiving the RL subframes from the user terminal via a reverse link of the satellite communication system.

In another example, a non-transitory computer-readable medium is disclosed. The non-transitory computer-readable medium may store instructions that, when executed by one or more processors of a SAN, cause the SAN to perform operations that may including provisioning a communication frame, for a user terminal, into a number of FL subframes and a different number of RL subframes, transmitting the FL subframes to the user terminal via a forward link of a satellite communication system, and receiving the RL subframes from the user terminal via a reverse link of the satellite communication system.

In another example, a method of operating a user terminal in a satellite communication system is disclosed. The method may include receiving a number of FL subframes, of a communication frame, from a SAN via a forward link of the satellite communication system, determining a number of RL subframes provisioned for the communication frame, wherein the number of RL subframes is different than the number of FL subframes, and transmitting the RL subframes to the SAN via a reverse link of the satellite communication system.

In another example, a user terminal is disclosed. The user terminal may include one or more processors and a memory configured to store instructions. Execution of the instructions by the one or more processors may cause the user terminal to receive a number of FL subframes, of a communication frame, from a SAN via a forward link of a satellite communication system, determine a number of RL subframes provisioned for the communication frame, wherein the number of RL subframes is different than the number of FL subframes, and transmit the RL subframes to the SAN via a reverse link of the satellite communication system.

In another example, a user terminal is disclosed. The user terminal may include means for receiving a number of FL subframes, of a communication frame, from a SAN via a forward link of a satellite communication system, means for determining a number of RL subframes provisioned for the communication frame, wherein the number of RL subframes is different than the number of FL subframes, and means for transmitting the RL subframes to the SAN via a reverse link of the satellite communication system.

In another example, a non-transitory computer-readable medium is disclosed. The non-transitory computer-readable medium may store instructions that, when executed by one or more processors of a user terminal, cause the user terminal to perform operations that may include receiving a number of FL subframes, of a communication frame, from a SAN via a forward link of a satellite communication system, determining a number of RL subframes provisioned for the communication frame, wherein the number of RL subframes is different than the number of FL subframes, and transmitting the RL subframes to the SAN via a reverse link of the satellite communication system.

BRIEF DESCRIPTION OF THE DRAWINGS

Aspects of this disclosure are illustrated by way of example and are not intended to be limited by the figures of the accompanying drawings.

DETAILED DESCRIPTION

Figure 1:
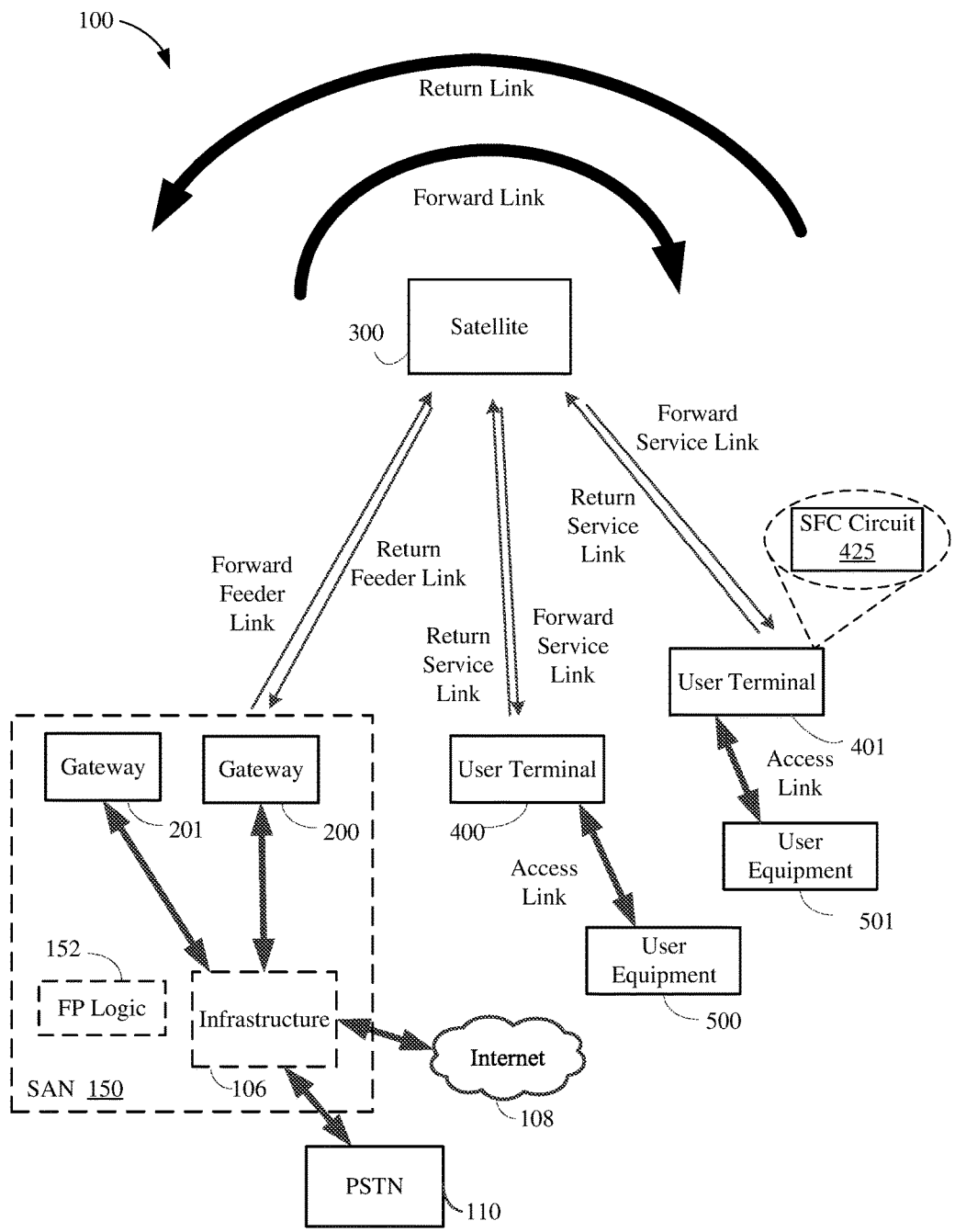
FIG. 1 shows a block diagram of an example communication system.

The example implementations described herein may provide increased throughput for forward-link (FL) transmissions in a satellite communication system by asymmetrically allocating FL subframes and RL subframes for a given communication frame. In satellite communications, the volume of data transmitted on the forward link (e.g., from a satellite access network to a user terminal) typically outweighs the volume of data transmitted on the reverse link (e.g., from the user terminal to the satellite access network). Thus, as described in more detail below, the satellite access network (SAN) may provision a communication frame, for a particular user terminal, into a number of FL subframes and a different number of RL subframes (e.g., depending on the proportion of data traffic on the forward link and/or reverse link). This allows a more efficient (e.g., optimized) allocation of resources within a given communication frame. To account for changes in traffic patterns and/or propagation delays in the satellite communications, the SAN may dynamically configure or adjust the proportion of FL subframes to RL subframes for each communication frame scheduled for a particular user terminal. Moreover, due to the asymmetry between FL subframes and RL subframes, at least one RL subframe of the given communication frame may be configured to provide hybrid automatic repeat request (HARQ) feedback information for multiple FL subframes.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the various aspects of the present disclosure. In other instances, well-known circuits and devices are shown in block diagram form to avoid obscuring the present disclosure. The various aspects of the present disclosure are not to be construed as limited to specific examples described herein but rather to include within their scopes all implementations defined by the appended claims.

FIG. 1 illustrates an example of a satellite communication system 100 which includes a plurality of satellites (although only one satellite 300 is shown for clarity of illustration) in non-geosynchronous orbits, for example, low-earth orbits (LEO), a satellite access network (SAN) 150 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UE (not shown) may be configured to receive only and therefore communicate with a UT only using a forward access link. In another implementation, one or more additional UE (not shown) may also communicate with UT 400 or UT 401.

Alternatively, a UT and a corresponding UE may be integral parts of a single physical device, such as a mobile telephone with an integral satellite transceiver and an antenna for communicating directly with a satellite, for example.

The UT 400 may include a subframe configuration (SFC) circuit 425 that may enable the UT 400 to determine a number of reverse-link (RL) subframes provisioned for a scheduled communication frame and/to provide feedback information to the SAN 150 on at least one of the RL subframes. More specifically, the SFC circuit 425 may allow the UT 400 to dynamically configure the RL subframes to be transmitted to the SAN 150 based on the communication frame, for example, as described in more detail with respect to FIGS. 7-15. In some aspects, the number of RL subframes may be different than a number of FL subframes provisioned for the same communication frame. Thereafter, the UT 400 may transmit the RL subframes to the SAN 150 via a reverse link of the satellite communication system 100.

The SAN 150 may include gateways 200 and 201, infrastructure 106, and additional elements or components (not shown for simplicity) for communicating with one or more user terminals 400 and/or 401 (e.g., via satellite 300) of the satellite communication system 100. The gateway 200 may have access to the Internet 108 or one or more other types of public, semiprivate or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations, the gateway 200 may interface to the Internet 108, PSTN 110, or one or more other types of public, semiprivate or private networks without using infrastructure 106. Still further, gateway 200 may communicate with other gateways, such as gateway 201 through the infrastructure 106 or alternatively may be configured to communicate to gateway 201 without using infrastructure 106. Infrastructure 106 may include, in whole or part, a network control center (NCC), a satellite control center (SCC), a wired and/or wireless core network and/or any other components or systems used to facilitate operation of and/or communication with the satellite communication system 100.

The SAN 150 may include frame provisioning (FP) logic 152 that may enable the SAN 150 to provision a communication frame, for a user terminal (e.g., UT 400), into a number of FL subframes and a different number of RL subframes. More specifically, the FP logic 152 may allow the SAN 150 to dynamically allocate the FL subframes and RL subframes for each communication frame scheduled for the user terminal, for example, as described in more detail below with respect to FIGS. 7-15. Thereafter, the SAN 150 may transmit the FL subframes to the user terminal via a forward link of the satellite communication system 100 and receive the RL subframes from the user terminal via a reverse link of the satellite communication system.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

Figure 2:
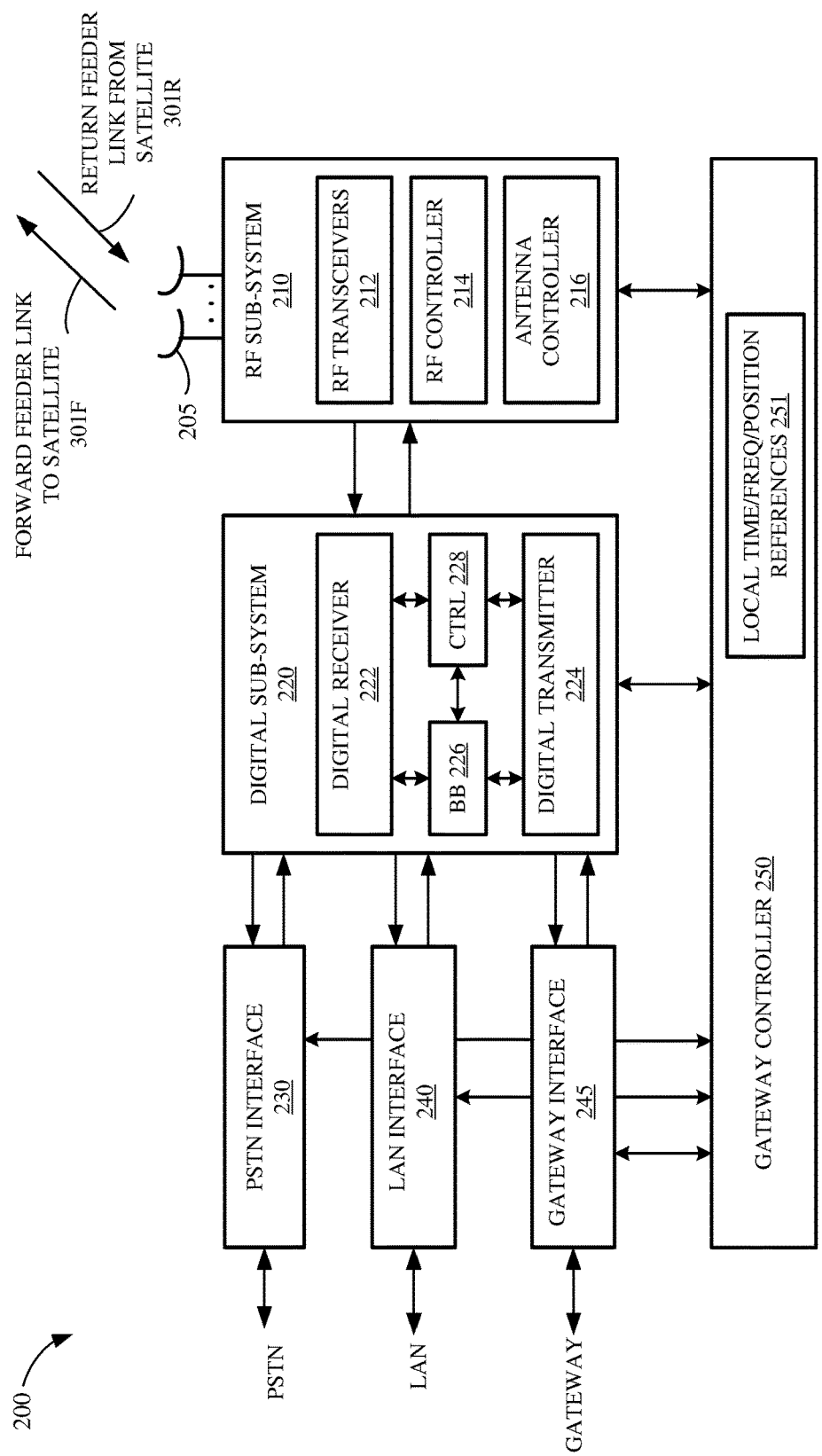
FIG. 2 shows a block diagram of one example of the gateway of FIG. 1.

FIG. 2 is an example block diagram of gateway 200, which also can apply to gateway 201 of FIG. 1. Gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. RF subsystem 210 is coupled to antennas 205 and to digital subsystem 220. Digital subsystem 220 is coupled to PSTN interface 230, to LAN interface 240, and to gateway interface 245. Gateway controller 250 is coupled to RF subsystem 210, digital subsystem 220, PSTN interface 230, LAN interface 240, and gateway interface 245.

RF subsystem 210, which may include a number of RF transceivers 212, an RF controller 214, and an antenna controller 216, may transmit communication signals to satellite 300 via a forward feeder link 301F, and may receive communication signals from satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to satellite 300 in a well-known manner. In addition, each transmit chain may include a digital-to-analog converter (DAC) to convert the digital signals received from digital subsystem 220 to analog signals to be transmitted to satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. Digital subsystem 220 may process communication signals received from RF subsystem 210 and forward the processed communication signals to PSTN interface 230 and/or LAN interface 240, and may process communication signals received from PSTN interface 230 and/or LAN interface 240 and forward the processed communication signals to RF subsystem 210.

Each digital receiver module 222 may correspond to signal processing elements used to manage communications between gateway 200 and UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to UT 400 via satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to digital receiver modules 222, digital transmitter modules 224, and baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

Baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects gateway 200 to a ground-based network (e.g., the Internet).

The LAN interface 240 may provide communication signals to, and receive communication signals from, an external LAN. For example, LAN interface 240 may be coupled to the internet 108 either directly or through additional infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, gateway interface 245 may communicate with other gateways via one or more dedicated communication lines or channels (not shown for simplicity). For other implementations, gateway interface 245 may communicate with other gateways using PSTN 110 and/or other networks such as the Internet 108 (see also FIG. 1). For at least one implementation, gateway interface 245 may communicate with other gateways via infrastructure 106.

Overall gateway control may be provided by gateway controller 250. The gateway controller 250 may plan and control utilization of satellite 300's resources by gateway 200. For example, the gateway controller 250 may analyze trends, generate traffic plans, allocate satellite resources, monitor (or track) satellite positions, and monitor the performance of gateway 200 and/or satellite 300. The gateway controller 250 may also be coupled to a ground-based satellite controller (not shown for simplicity) that maintains and monitors orbits of satellite 300, relays satellite usage information to gateway 200, tracks the positions of satellite 300, and/or adjusts various channel settings of satellite 300.

For the example implementation illustrated in FIG. 2, the gateway controller 250 includes a local time, frequency, and position references 251, which may provide local time and frequency information to the RF subsystem 210, the digital subsystem 220, and/or the interfaces 230, 240, and 245. The time and frequency information may be used to synchronize the various components of gateway 200 with each other and/or with satellite(s) 300. The local time, frequency, and position references 251 may also provide position information (e.g., ephemeris data) of satellite(s) 300 to the various components of gateway 200. Further, although depicted in FIG. 2 as included within gateway controller 250, for other implementations, the local time, frequency, and position references 251 may be a separate subsystem that is coupled to gateway controller 250 (and/or to one or more of digital subsystem 220 and RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with satellite(s) 300, for example, to retrieve ephemeris data from satellite(s) 300. The gateway controller 250 may also receive processed information (e.g., from the SCC and/or the NCC) that allows gateway controller 250 to properly aim its antennas 205 (e.g., at the appropriate satellite(s) 300), to schedule beam transmissions, to coordinate handovers, and to perform various other well-known functions.

Figure 3:
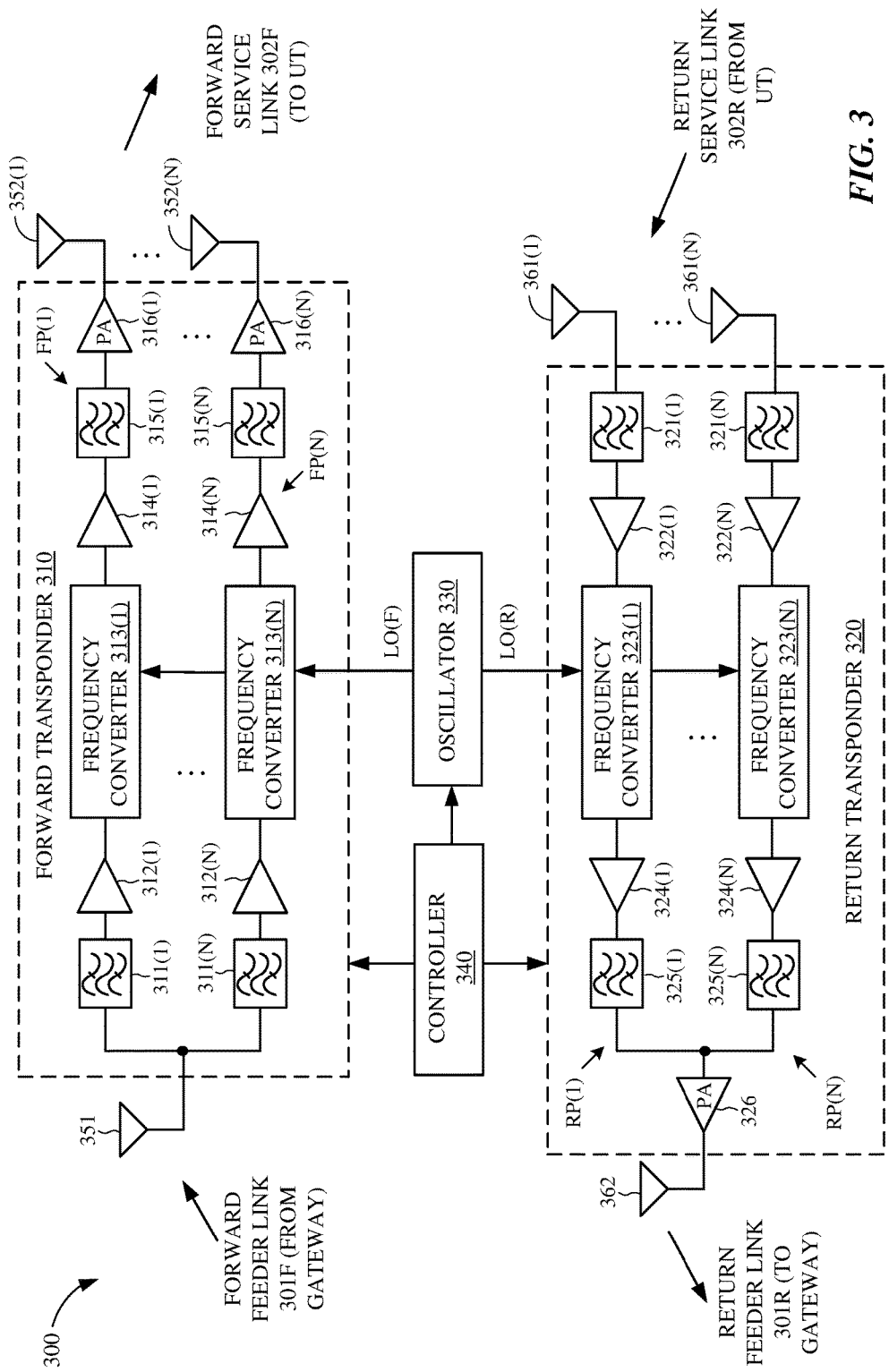
FIG. 3 shows a block diagram of one example of the satellite of FIG. 1.

FIG. 3 is an example block diagram of satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and UT 400. It will be appreciated that disclosure is not limited to any specific satellite configuration and any satellite or combinations of satellites that can provide the functional connection between the gateway 200 and UT 400 can be considered within the scope of the disclosure. In one example, satellite 300 is shown to include a forward transponder 310, a return transponder 320, an oscillator 330, a controller 340, forward link antennas 351-352, and return link antennas 361-362. The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from satellite 300 to UT 400). The second LNA 314 amplifies the frequency-converted communication signals, and the second bandpass filter 315 filters signal components having frequencies outside of the associated channel width. The PA 316 amplifies the filtered signals to a power level suitable for transmission to UTs 400 via respective antenna 352. The return transponder 320, which includes a number N of return paths RP(1)-RP(N), receives communication signals from UT 400 along return service link 302R via antennas 361(1)-361(N), and transmits communication signals to gateway 200 along return feeder link 301R via one or more antennas 362. Each of the return paths RP(1)-RP(N), which may process communication signals within a corresponding channel or frequency band, may be coupled to a respective one of antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from satellite 300 to gateway 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the gateway 200.

Oscillator 330, which may be any suitable circuit or device that generates an oscillating signal, provides a forward local oscillator signal LO(F) to the frequency converters 313(1)-313(N) of forward transponder 310, and provides a return local oscillator signal LO(R) to frequency converters 323(1)-323(N) of return transponder 320. For example, the LO(F) signal may be used by frequency converters 313(1)-313(N) to convert communication signals from a frequency band associated with the transmission of signals from gateway 200 to satellite 300 to a frequency band associated with the transmission of signals from satellite 300 to UT 400. The LO(R) signal may be used by frequency converters 323(1)-323(N) to convert communication signals from a frequency band associated with the transmission of signals from UT 400 to satellite 300 to a frequency band associated with the transmission of signals from satellite 300 to gateway 200.

Controller 340, which is coupled to forward transponder 310, return transponder 320, and oscillator 330, may control various operations of satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein with respect to FIGS. 12-15.

Figure 4:
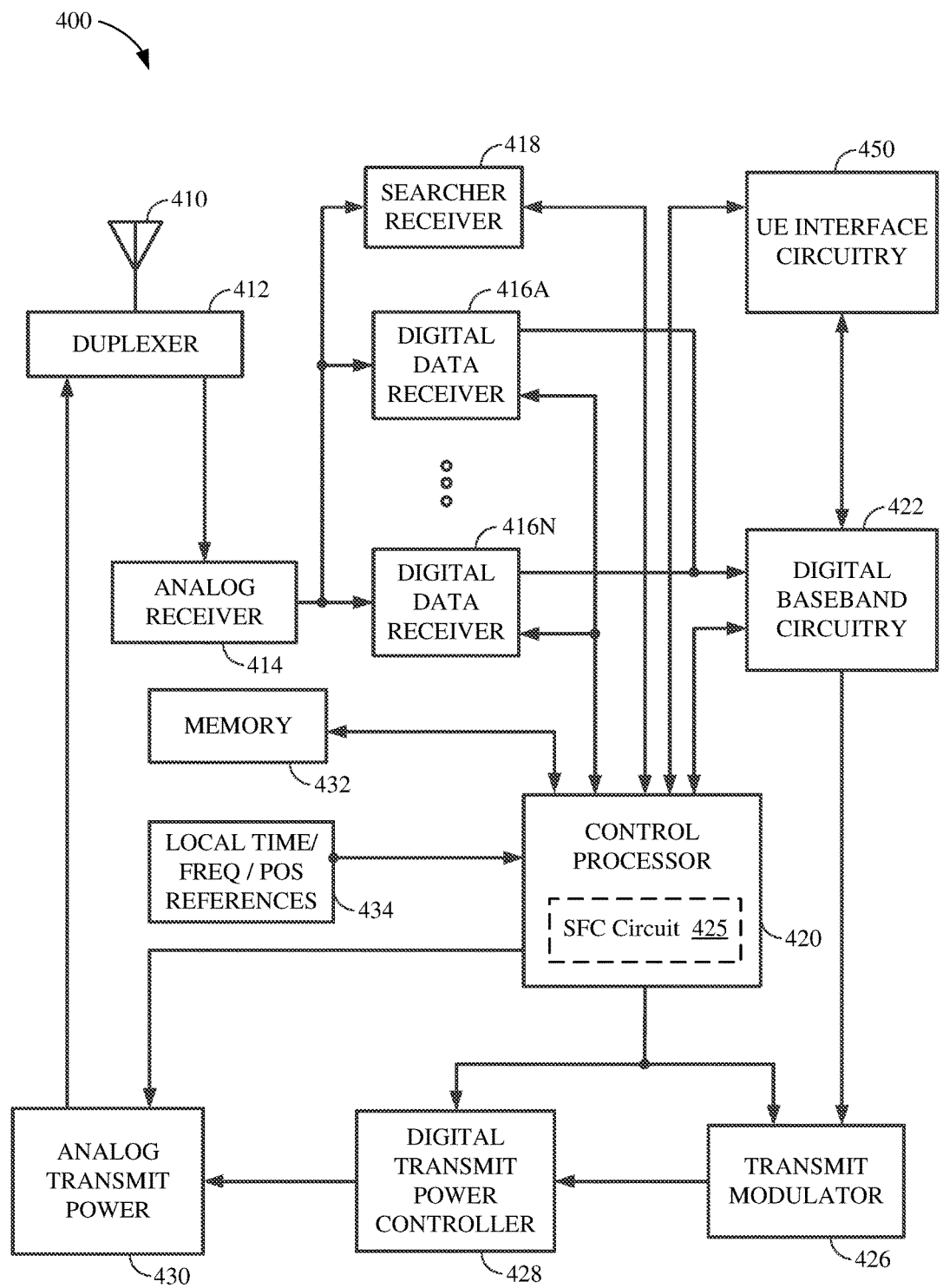
FIG. 4 shows a block diagram of one example of the user terminal (UT) of FIG. 1.

An example of a transceiver for use in the UT 400 or 401 is illustrated in FIG. 4. In FIG. 4, at least one antenna 410 is provided for receiving forward link communication signals (e.g., from satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers to 416N can be used to obtain desired levels of signal diversity, depending on the acceptable level of transceiver complexity, as would be apparent to one skilled in the relevant art.

At least one user terminal control processor 420 is coupled to digital data receivers 416A-416N and searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The UT 400 may include a subframe configuration (SFC) circuit 425 that may enable the UT 400 to determine a number of reverse-link (RL) subframes provisioned for a scheduled communication frame and/to provide feedback information to a satellite access network (e.g., SAN 150) on at least one of the RL subframes. More specifically, the SFC circuit 425 may allow the UT 400 to dynamically configure the RL subframes to be transmitted to the SAN based on the communication frame, for example, as described in more detail below with respect to FIGS. 7-15. In some aspects, the number of RL subframes may be different than a number of FL subframes provisioned for the same communication frame. Thereafter, the UT 400 may transmit the RL subframes to the SAN via a reverse link of a satellite communication system.

The outputs of digital data receivers 416A-416N are coupled to digital baseband circuitry 422 within the user terminal. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, a control processor 420.

When voice or other data is prepared as an output message or communications signal originating with the user terminal, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., satellite 300).

In FIG. 4, the UT transceiver also includes a memory 432 associated with the control processor 420. The memory 432 may include instructions for execution by the control processor 420 as well as data for processing by the control processor 420.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time and frequency synchronization for the UT 400.

Digital data receivers 416A-N and searcher receiver 418 are configured with signal correlation elements to demodulate and track specific signals. Searcher receiver 418 is used to search for pilot signals, or other relatively fixed pattern strong signals, while digital data receivers 416A-N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element 432 as desired.

The control processor 420 may also be coupled to UE interface circuitry 450 to allow communications between UT 400 and one or more UEs. UE interface circuitry 450 may be configured as desired for communication with various UE configurations and accordingly may include various transceivers and related components depending on the various communication technologies employed to communicate with the various UEs supported. For example, UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with UT 400.

Figure 5:
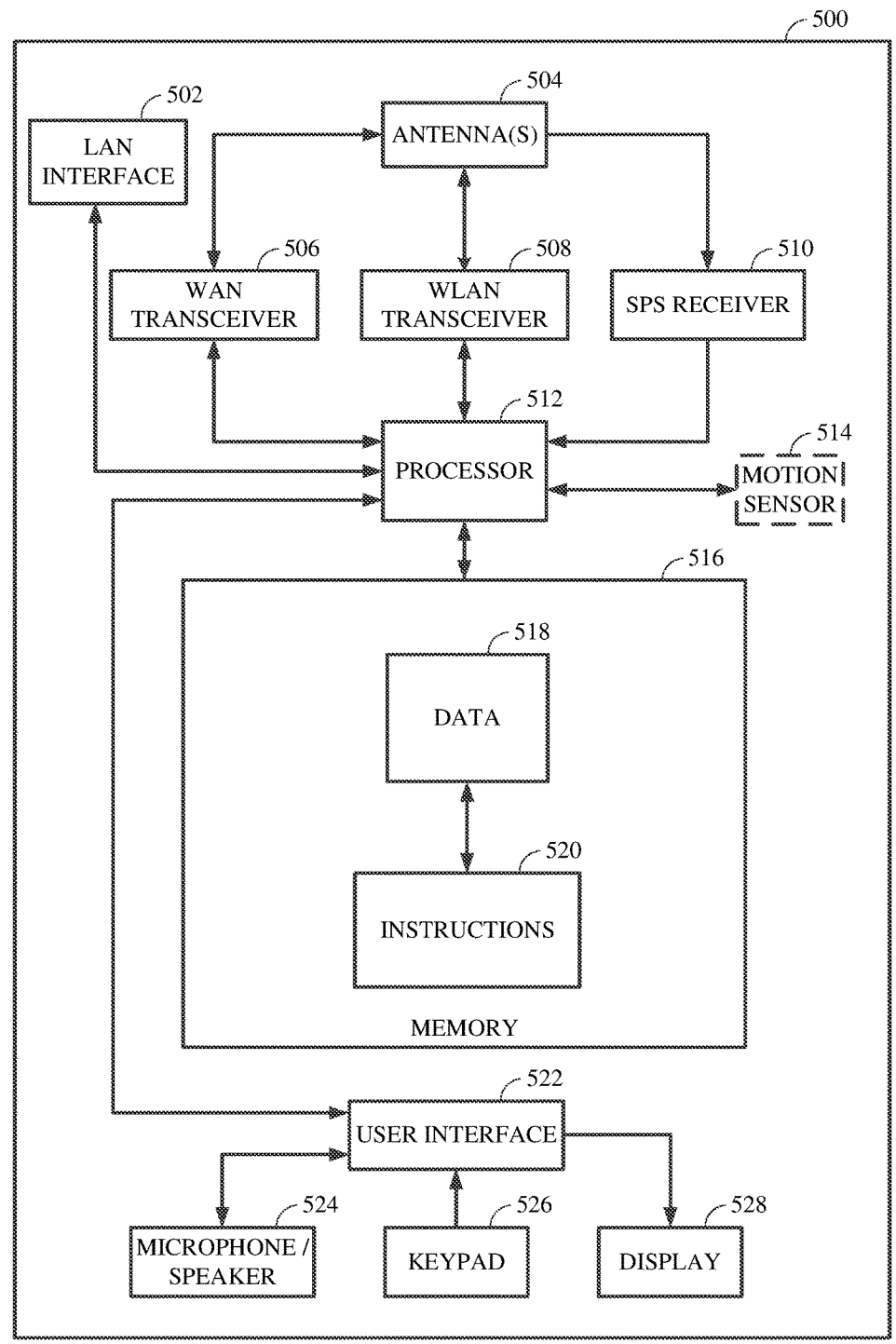
FIG. 5 shows a block diagram of one example of the user equipment (UE) of FIG. 1.

FIG. 5 is a block diagram illustrating an example of UE 500, which also can apply to UE 501 of FIG. 1. The UE 500 as shown in FIG. 5 may be a mobile device, a handheld computer, a tablet, a wearable device, a smart watch, or any type of device capable of interacting with a user, for example. Additionally, the UE may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), GLONASS and/or any other global or regional satellite based positioning system. In an alternate aspect, the UE 500 may include a WLAN transceiver 508, such as a Wi-Fi transceiver, with or without the LAN interface 502, WAN transceiver 506, and/or SPS receiver 510, for example. Further, UE 500 may include additional transceivers such as Bluetooth, ZigBee and other known technologies, with or without the LAN interface 502, WAN transceiver 506, WLAN transceiver 508 and/or SPS receiver 510. Accordingly, the elements illustrated for UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

As mentioned above, GSO satellites are deployed in geostationary orbits at approximately 35,000 km above the Earth's surface, and revolve around the Earth in an equatorial orbit at the Earth's own angular velocity. In contrast, NGSO satellites are deployed in non-geostationary orbits and revolve around the Earth above various paths of the Earth's surface at relatively low altitudes (e.g., as compared with GSO satellites).

Figure 6:
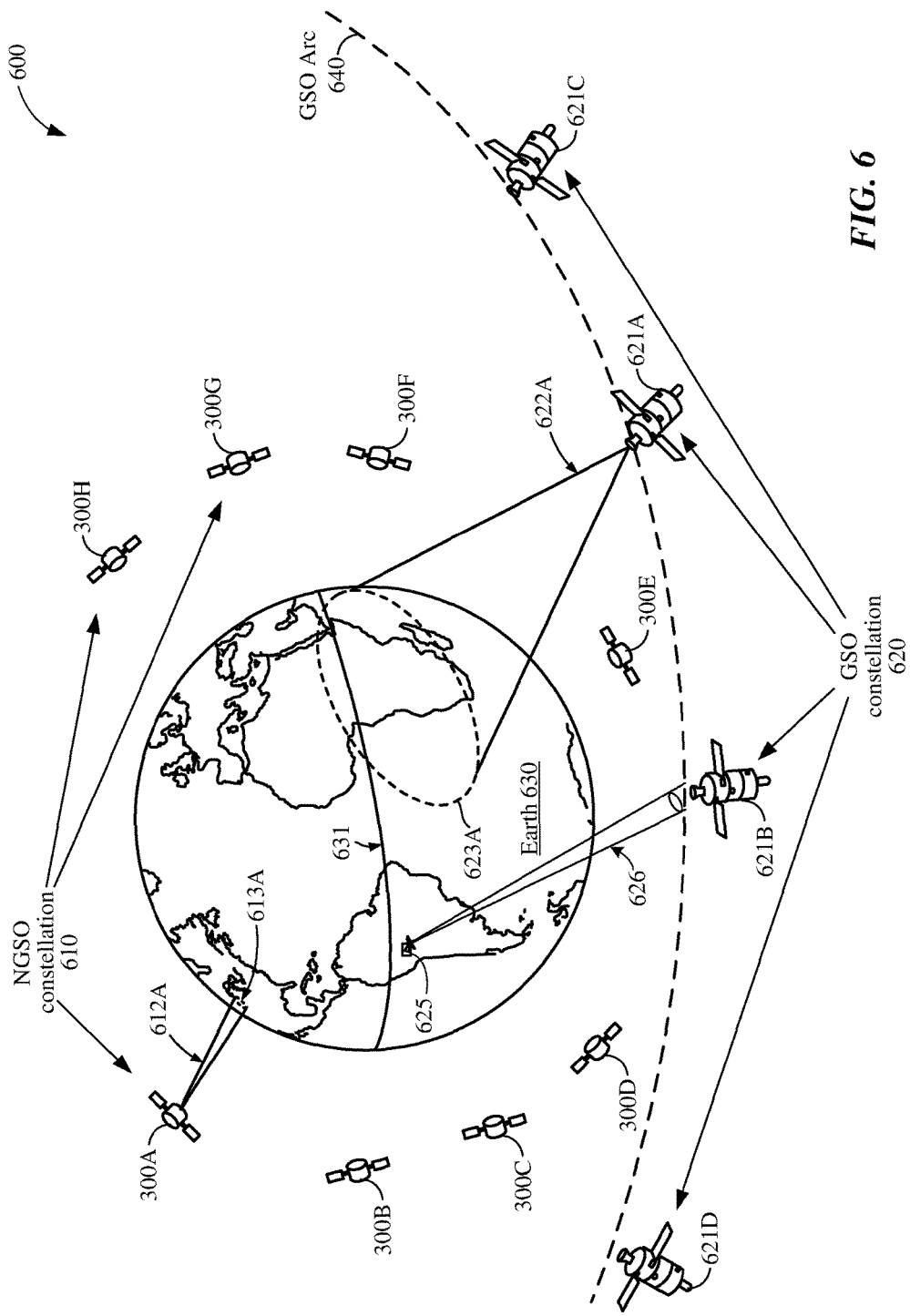
FIG. 6 shows a diagram depicting an NGSO satellite constellation and a GSO satellite constellation orbiting the earth.

For example, FIG. 6 shows a diagram 600 depicting a first constellation 610 of NGSO satellites 300A-300H and a second constellation 620 of GSO satellites 621A-621D in orbit around Earth 630. Although depicted in FIG. 6 as including only eight NGSO satellites 300A-300H, the first constellation 610 may include any suitable number of NGSO satellites, for example, to provide world-wide satellite coverage. For some implementations, the first constellation 610 may include between 600 and 900 NGSO satellites. Similarly, although depicted in FIG. 6 as including only four GSO satellites 621A-621D, the second constellation 620 may include any suitable number of GSO satellites, for example, to provide world-wide satellite coverage. In addition, although not shown in FIG. 6 for simplicity, one or more other constellations of GSO satellites and/or one or more other constellations of NGSO satellites may be in orbit above Earth 630.

The first constellation 610, which may hereinafter be referred to as the NGSO satellite constellation 610, may provide a first satellite service to most, if not all, areas on Earth 630. The second constellation 620, which may hereinafter be referred to as the GSO satellite constellation 620, may provide a second satellite service to large portions of Earth 630. The first satellite service may be different than the second satellite service. For some aspects, the first satellite service provided by the NGSO satellite constellation 610 may correspond to a global broadband Internet service, and the second satellite service provided by the GSO satellite constellation 620 may correspond to a satellite-based broadcast (e.g., television) service. Further, for at least some implementations, each of NGSO satellites 300A-300H may be one example of satellite 300 of FIGS. 1 and 3.

The NGSO satellites 300A-300H may orbit the Earth 630 in any suitable number of non-geosynchronous orbital planes (not shown for simplicity), and each of the orbital planes may include a plurality of NGSO satellites (e.g., such as one or more of the NGSO satellites 300A-300H). The non-geosynchronous orbital planes may include, for example, polar orbital patterns and/or Walker orbital patterns. Thus, to a stationary observer on Earth 630, the NGSO satellites 300A-300H appear to move quickly across the sky in a plurality of different paths across the Earth's surface, with each of the NGSO satellites 300A-300H providing coverage for a corresponding path across the earth's surface.

In contrast, the GSO satellites 621A-621D may be in a geosynchronous orbit around Earth 630 and thus, to a stationary observer on Earth 630, may appear motionless in a fixed position in the sky located above the Earth's equator 631. Each of the GSO satellites 621A-621D maintains a relatively fixed line-of-sight with a corresponding GSO ground station on Earth 630. For example, GSO satellite 621B is depicted in FIG. 6 as maintaining a relatively fixed line-of-sight with a GSO ground station 625. It is noted that for a given point on the surface of Earth 630, there may be an arc of positions in the sky along which the GSO satellites 621A-621D may be located. This arc of GSO satellite positions may be referred to herein as the GSO arc 640. The receiving area for a GSO ground station (e.g., such as GSO ground station 625) may be defined by an antenna pattern of typically fixed orientation and fixed beam width (such as a beam width defined by an ITU specification). For example, the GSO ground station 625 is depicted as transmitting a beam 626 towards GSO satellite 621B.

In some aspects, each of the NGSO satellites 300A-300H may include a number of directional antennas to provide high-speed forward links (e.g., downlinks) with user terminals such as UT 400 of FIG. 1 and/or with gateways such as gateway 200 of FIG. 1. A high-gain directional antenna achieves higher data rates and is less susceptible to interference than an omni-directional antenna by focusing radiation into a relatively narrow beam width (as compared to the relatively wide beam width associated with an omni-directional antenna). For example, as depicted in FIG. 6, the coverage area 613A provided by a beam 612A transmitted from NGSO satellite 300A is relatively small compared to the coverage area 623A provided by a beam 622A transmitted from GSO satellite 621A.

Because the NGSO satellites 300A-300H revolve around the earth 630 relatively quickly (e.g., approximately every 90 minutes for low-earth-orbit (LEO) satellites), their positions change quickly relative to a fixed location on earth 630. To provide coverage over a wide area of the earth's surface (e.g., to provide Internet services across the United States), each of the NGSO satellites 300A-300H may provide coverage for a corresponding path across the earth's surface. For example, the NGSO satellites 300A-300H may each transmit any number of beams, and one or more of the beams may be directed towards overlapping regions on the earth's surface. As used herein, the footprint of a satellite is the surface area (on Earth) within which all UTs can communicate with the satellite (above a minimum elevation angle). The area covered by a beam transmitted (e.g., from a corresponding antenna) of the satellite is referred to herein as the beam coverage area. Thus, the footprint of a satellite may be defined by a number of beam coverage areas provided by a number of beams transmitted from the satellite.

Figure 7:
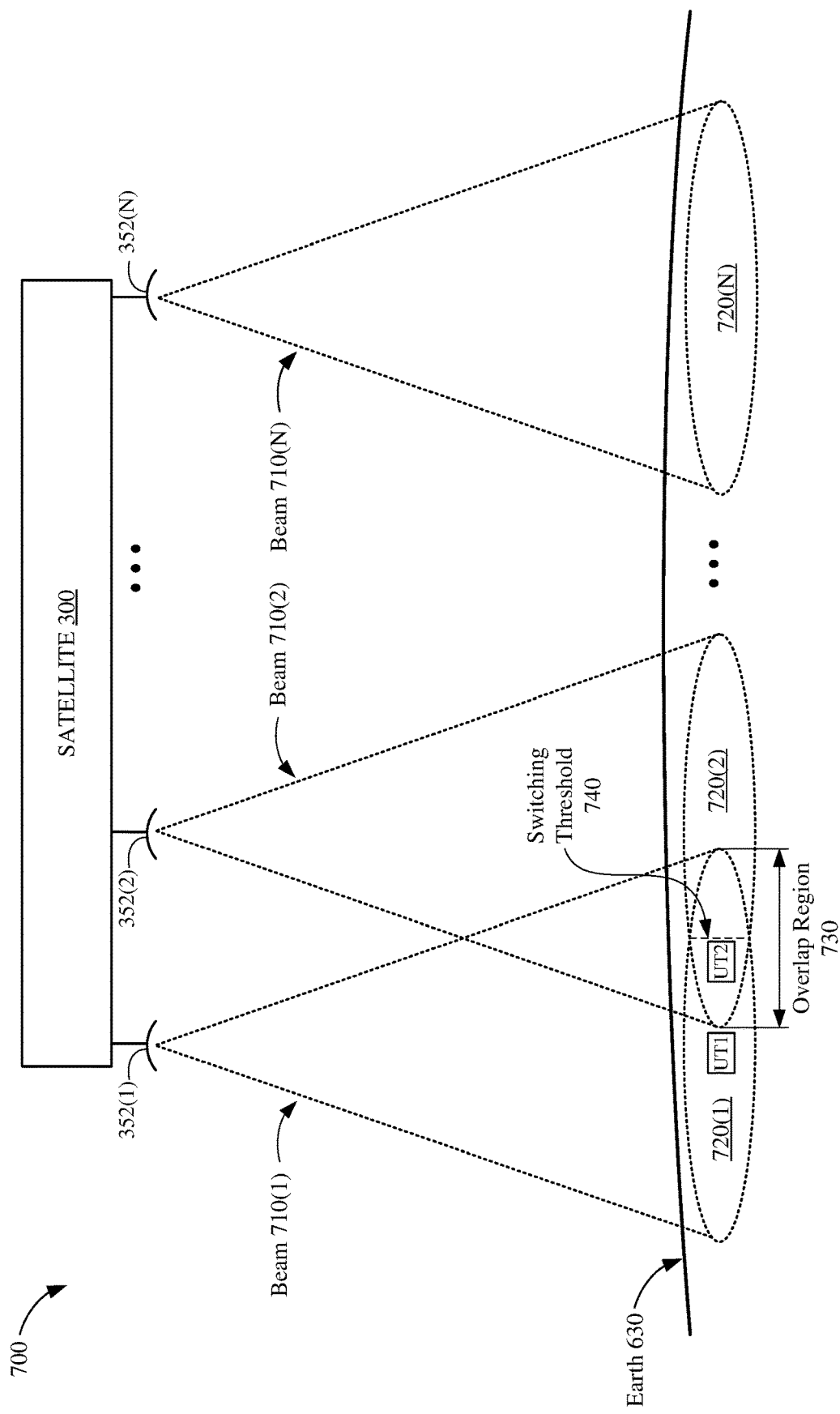
FIG. 7 depicts an NGSO satellite transmitting a number of beams onto the surface of the Earth.

FIG. 7 shows a diagram 700 depicting satellite 300 transmitting a number (N) of beams 710(1)-710(N) from a respective number (N) of antennas 352(1)-352(N). Referring also to FIG. 3, each of the antennas 352(1)-352(N) may be coupled to a corresponding forward path (FP) in the forward transponder 310 of satellite 300. Each of the beams 710(1)-710(N) may be used to transmit data to, and/or receive data from, a number of user terminals UT1 and UT2 that are located within the beam's coverage area on Earth 630. For example, each of the user terminals UT1 and UT2 may be an embodiment of UT 400 of FIG. 4. Thus, in some aspects, the beams 710(1)-710(N) may represent the forward service link, and/or reverse service link, between a satellite access network (e.g., SAN 150 of FIG. 1) and the user terminals UT1 and UT2.

For the example diagram 700 of FIG. 7, the beams 710(1)-710(N) are depicted as providing coverage areas 720(1)-720(N), respectively, on Earth 630. Together, the coverage areas 720(1)-720(N) provided by respective beams 710(1)-710(N) may define the footprint of satellite 300. Each of the coverage areas 720(1)-720(N) may extend across an entire width of the satellite's footprint. In some implementations, the coverage areas 720(1)-720(N) may be of other suitable shapes, sizes, and/or orientations. Further, for at least some implementations, all satellites 300 in the NGSO satellite constellation 610 may have substantially similar footprints. Each of the beams 710(1)-710(N) operates as a respective communications channel of the satellite 300. As the satellite 300 passes each of the user terminals UT1 and UT2, the channel quality of a given beam may deteriorate, whereas the channel quality of a different beam may improve. Thus, each of the user terminals UT1 and UT2 may periodically switch communication channels from one beam to another. This process may be referred to herein as "inter-beam handover."

Adjacent pairs of the coverage areas 720(1)-720(N) may touch and/or overlap each other, for example, so that the footprint provided by the beams 710(1)-710(N) may have minimal coverage gaps. In the example of FIG. 7, the intersection of beams 710(1) and 710(2) form an overlap region 730. Based on the movements of the satellite 300, a user terminal (e.g., UT1) lying exclusively within coverage area 720(1) (and outside the overlap region 730) at a first time may eventually fall within the overlap region 730 at a second time. A user terminal within the overlap region 730 (e.g., UT2) may be able to communicate with satellite 300 using beam 710(1) or beam 710(2). At a certain point in the satellite's orbit, the channel quality of beam 710(2) will exceed the channel quality of beam 710(1), thus prompting an inter-beam handover from the current beam 710(1) (e.g., the "source beam") to the new beam 710(2) (e.g., the "target beam"). For example, the inter-beam handover for a particular user terminal may be triggered when the user terminal crosses a switching threshold 740 (e.g., such that the user terminal is subsequently positioned more prominently within the coverage area 720(2) of the target beam 710(2) than the coverage area 720(1) of the source beam 710(1)).

To support half-duplex communication between the SAN and a particular UT, transmissions on the forward service link (e.g., from SAN to UT) may be coordinated with transmissions on the reverse service link (e.g., from UT to SAN). Thus, a given communications cycle (e.g., ~10 ms) may be subdivided into a number of forward-link (FL) transmissions and a number of reverse-link (RL) transmissions. For example, each FL transmission may correspond with an individual subframe (e.g., FL subframe) of data and/or control information sent from the SAN to a particular user terminal. Similarly, each RL transmission may correspond with an individual subframe (e.g., RL subframe) of data and/or control information sent from the user terminal to the SAN. The FL subframes and RL subframes of a given communication cycle may collectively form a communication (or "radio") frame. For example, a typical communication frame may have an overall duration of 10 ms. The communication frame may be subdivided into 10 subframe slots each having a duration of 1 ms. Each subframe slot may be occupied by a FL subframe, an RL subframe, or left unassigned.

HARQ is a process by which a receiving device may request retransmission of data that was received in error. Unlike standard automatic repeat request (ARQ) processes, which are carried out by the radio link control (RLC) layer, HARQ processes are performed at the physical (PHY) layer (e.g., and managed by the media access control (MAC) layer). More specifically, HARQ allows for buffering and combining of incorrectly received data (e.g., packets, frames, PDUs, MPDUs, etc.) to potentially reduce the number of retransmissions needed to properly reconstruct a particular unit of data. For example, if a user terminal receives an incorrect unit of data from a SAN, the user terminal may request retransmission of that particular unit of data. Rather than discard the incorrect unit of data, the user terminal may also store the incorrect unit of data (e.g., in a HARQ buffer) to be combined with the retransmitted data, for example, to more quickly recover the correct unit of data. For example, if both the original unit of data and the retransmitted data have errors, the user terminal may combine the error-free portions to reconstruct the correct unit of data. This process may be repeated, as necessary, for any number of retransmissions (e.g., until the correct unit of data is recovered). The user terminal may use the RL subframes (e.g., of a given communication frame) to send HARQ feedback information to the SAN. The HARQ feedback information may include an acknowledgement (ACK) or negative acknowledgement (NACK) of respective FL data (e.g., that was received correctly or incorrectly).

For conventional (e.g., "symmetric") half-duplex operation, the number of FL subframes in a given communication frame is equal to the number of RL subframes. One or more subframe slots may be left unassigned to provide a buffer for the UT to switch between FL communications and RL communications. As a result, only 40% (or less) of a communication cycle may be used for FL transmissions. For example, to ensure symmetric resource allocation, only four subframe slots of a given communication frame (e.g., having ten total subframe slots) may be allocated for FL transmissions while another four subframe slots may be allocated for RL transmissions. Each RL subframe may provide HARQ feedback information (e.g., ACK/NACK) for a respective FL subframe of the same communication frame. At least two subframe slots may be left unassigned (e.g., to provide a buffer for the UT to transition between the forward service link and the reverse service link). This results in an 80% subframe utilization for the communication frame. The example implementations recognize that allocating only 40% of a communication frame to FL transmissions may be inefficient for satellite applications where data traffic on the forward link substantially outweighs data traffic on the reverse link (e.g., satellite television and/or video streaming services).

In example implementations, a radio resource controller (RRC) of the SAN may selectively configure a UT to operate in an "asymmetric" half-duplex mode. When operating in asymmetric half-duplex mode, a scheduler provided with the SAN may allocate FL and RL resources in an asymmetric fashion. For example, the scheduler may provision a communication frame for a particular UT into a number of FL subframes and a different number of RL subframes (e.g., depending on the proportion of data traffic on the forward link and/or reverse link). For example, if the amount of FL data traffic is expected to exceed the amount of RL data traffic, the scheduler may allocate more subframe slots for FL subframes (e.g., and fewer subframe slots for RL subframes). On the other hand, if the amount of RL data traffic is expected to exceed the amount of FL data traffic, the scheduler may allocate more subframe slots for RL subframes (e.g., and fewer subframe slots for FL subframes).

Due to the asymmetric allocation of FL and RL resources, at least one RL subframe may be configured to provide HARQ feedback information for multiple FL subframes previously transmitted to the UT. For example, the SAN may communicate RRC information to the UT indicating which of the RL subframes is to include the HARQ feedback information for multiple FL subframes. For some implementations, a single RL subframe may include a "block" ACK/NACK message that includes ACK/NACK information for multiple FL subframes previously transmitted by the SAN.

Figure 8:
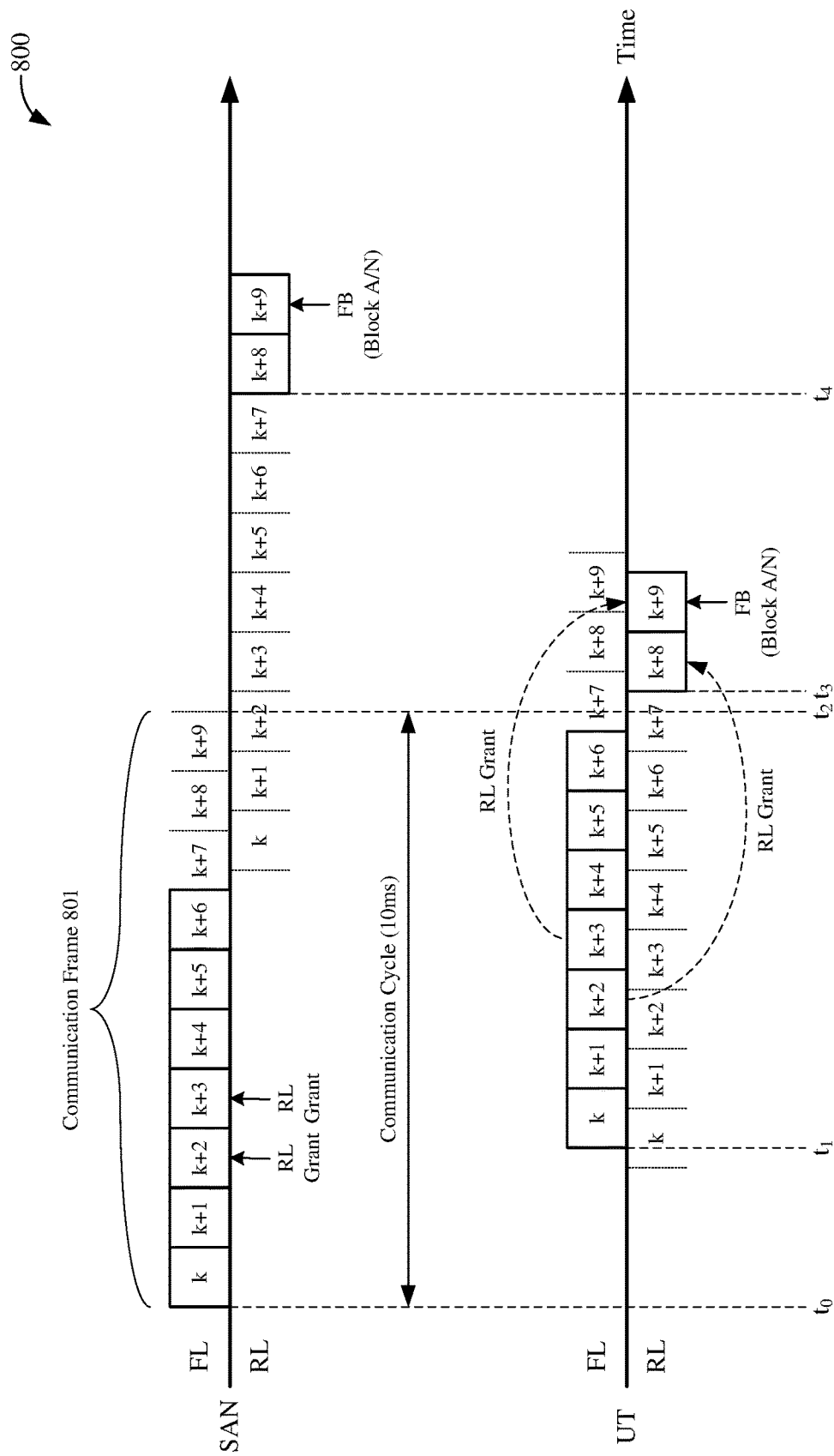
FIG. 8 shows an example timing diagram depicting an asymmetric distribution of forward-link (FL) and reverse-link (RL) subframes for a given communication frame.

FIG. 8 shows an example timing diagram 800 depicting an asymmetric distribution of FL and RL subframes for a given communication frame 801. More specifically, the timing diagram 800 shows a SAN in communication with a UT via a satellite communication system (not shown for simplicity). For example, the SAN and the UT may be embodiments of SAN 150 and UT 400, respectively. The communication frame 801 spans a communication cycle of 10 ms (e.g., from time $t_0$ to $t_2$), and is subdivided into ten 1 ms subframe slots (e.g., k to k+9).

In example implementations, the SAN (or scheduler) may provision the communication frame 801 into seven FL subframes and two RL subframes. For example, the FL subframes may be allocated to the first seven subframe slots (k through k+6) of the communication frame 801 and the RL subframes may be allocated to the last two subframe slots (k+8 and k+9) of the communication frame 801. The eighth subframe slot (k+7) may be left unassigned (e.g., to provide a buffer or guard interval for enabling the UT to transition from FL communications to RL communications). Because resource allocation is controlled by the SAN (or scheduler), each of the FL subframes may be preceded by a respective FL grant (e.g., identifying the presence and/or position of the corresponding FL subframe to the UT).

Each of the RL subframes may also be associated with a respective RL grant (e.g., carried by one or more of the FL subframes). In example implementations, each RL grant may allocate a subframe slot (e.g., for RL transmissions) that occurs 6 subframe slots later than the subframe slot in which the RL grant is transmitted. For example, as shown in FIG. 8, the third FL subframe (e.g., in subframe slot k+2) may include an RL grant that allocates the ninth subframe slot (k+8) of the communication frame 801 for RL transmissions. Similarly, the fourth FL subframe (e.g., in subframe slot k+3) may include an RL grant that allocates the tenth subframe slot (k+9) of the communication frame 801 for RL transmissions.

The SAN transmits the FL subframes to the UT, at time $t_0$, via a forward service link of the satellite communication system. Due to propagation delays in the satellite communication system, the UT receives the FL subframes some time later, at time $t_1$. As described above, the FL subframes received by the UT may coincide with the first seven subframe slots (k through k+6) of the communication frame 801. The UT may check the data sent via the FL subframes (e.g., based on cyclic redundancy check (CRC) and/or forward error correction (FEC) information) to determine whether each FL subframe is received correctly (e.g., and to fix any correctable errors in the received data). The UT may generate HARQ feedback (FB) information indicating which, if any, of the FL subframes were received correctly and/or requesting retransmission of any FL subframes that were not correctly received by the UT. In some aspects, the UT may generate HARQ feedback information for individual transport blocks within a received FL subframe.

Still further, the UT may identify RL grants in the received FL subframes to determine which, if any, of the remaining subframe slots (e.g., subframe slots k+7 through k+9) have been allocated for RL transmissions. In the example of FIG. 8, the UT may detect RL grants in the third and fourth FL subframes (e.g., coinciding with subframe slots k+2 and k+3, respectively) to determine that the ninth and tenth subframe slots (k+8 and k+9) of the communication frame 801 have been allocated for RL transmissions. The UT may then transmit the RL subframes to the SAN, at time $t_3$, via a reverse service link of the satellite communication system. Due to propagation delays in the satellite communication system, the SAN receives the RL subframes some time later, at time $t_4$.

For some implementations, the UT may be configured to transmit the HARQ feedback information via the final RL subframe (e.g., coinciding with subframe slot k+9) of a given communication cycle. For example, the feedback information may include a block ACK/NACK (block A/N) message indicating an ACK or NACK for multiple FL subframes transmitted by the SAN. In some aspects, each block A/N message may indicate a respective ACK or NACK for the total number (N) of FL subframes allocated for a given communication frame (e.g., up to 8 FL subframes for half-duplex UTs or up to 10 FL subframes for full-duplex UTs). A set of ACK/NACK data (e.g., for a particular FL subframe) may include one or more bits of information. Thus, in the example of FIG. 8, a single block A/N message may include seven sets of ACK/NACK data (e.g., each set of ACK/NACK data indicating a respective ACK or NACK for one of seven FL subframes).

Still further, for some implementations, the block A/N message may include ACK/NACK information for the first four FL subframes of the current communication frame, and the last N-4 FL subframes from a previous communication frame. Thus, in the example of FIG. 8, the block A/N message sent on subframe slot k+9 may include ACK/NACK information for the first four FL subframes (e.g., coinciding with subframe slots k through k+3) of communication frame 801 and the last three FL subframes of a previous communication frame (not shown for simplicity).

The block A/N message may be encoded with little or no modifications to existing physical reverse-link control channel (PRCCH) formats. To further reduce implementation complexity and/or improve system robustness, the block A/N message may be configured to provide feedback information for the maximum number (e.g., 8) of FL subframes that may be provisioned for a given communication frame (e.g., regardless of the actual number of FL subframes that are scheduled or allocated). For example, the block A/N message may have a fixed size that can accommodate feedback information for up to eight FL subframes. If fewer than eight FL subframes are scheduled (e.g., as in the example of FIG. 8), the ACK/NACK data sets assigned to the non-scheduled FL subframes (e.g., coinciding with subframe slot k+7 in the example of FIG. 8) may be set to NACK or discontinuous transmission (DTX).

Because a single block A/N message may provide HARQ feedback information for the maximum number of FL subframes of a communication frame, all of the HARQ feedback information for a given communication cycle may be encoded onto a single RL subframe (e.g., coinciding with subframe slot k+9). This allows the SAN (or scheduler) to allocate more FL subframes at the expense of fewer RL subframes (e.g., to further increase the throughput of FL communications). For example, with reference to FIG. 8, the SAN may further increase FL throughput by allocating an eighth FL subframe (e.g., in subframe slot k+7) in lieu of the RL subframe allocated for subframe slot k+8.

In some aspects, multiple A/N bits may be "bundled" together (e.g., using a logical AND operator) to reduce the overhead of the block A/N message. Still further, in some aspects, certain HARQ feedback information may be dropped from a given RL subframe to make room for the block A/N message. For example, if a periodic channel quality information (CQI) feedback is due at the same time a block A/N message is to be transmitted, the CQI feedback may be dropped from the corresponding RL subframe if the given control format cannot support both the CQI feedback and the block A/N message.

As described above, with respect to FIG. 7, an LEO satellite 300 moves quickly over the surface of the earth 630. Thus, by the time the UT has finished receiving the FL subframes via a source beam (e.g., beam 710(1)), the UT may already be well within the coverage area of a target beam (e.g., beam 710(2)). In other words, the UT may perform an inter-beam handover during the interval between reception of the FL subframes (e.g., at time $t_1$) and transmission of the RL subframes (e.g., at time $t_3$). As a result, the propagation delay on the reverse service link (e.g., as perceived by the SAN) may be shorter than the propagation delay on the forward service link.

Due to changes in propagation delay, the FL subframes that the UT is able to receive and/or the RL subframes that the UT is able to transmit during a given communication cycle may vary depending on the relative location of the UT within the footprint of the satellite 300 at any given time. With reference to FIG. 3, at a given instance, UT1 may be located at or near the center of coverage area 720(1) while UT2 may be located at the edge of coverage area 720(1). However, at a later instance (e.g., due to movement of the satellite 300), UT2 may be located at or near the center of coverage area 720(2) while UT1 may be located at the edge of coverage area 720(2). Thus, in example implementations, the SAN (or scheduler) may dynamically allocate FL subframes and/or RL subframes for a particular UT based at least in part on the asymmetric distribution of FL/RL subframes and the location of the UT (e.g., relative to the footprint of the satellite 300).

Figure 9A:
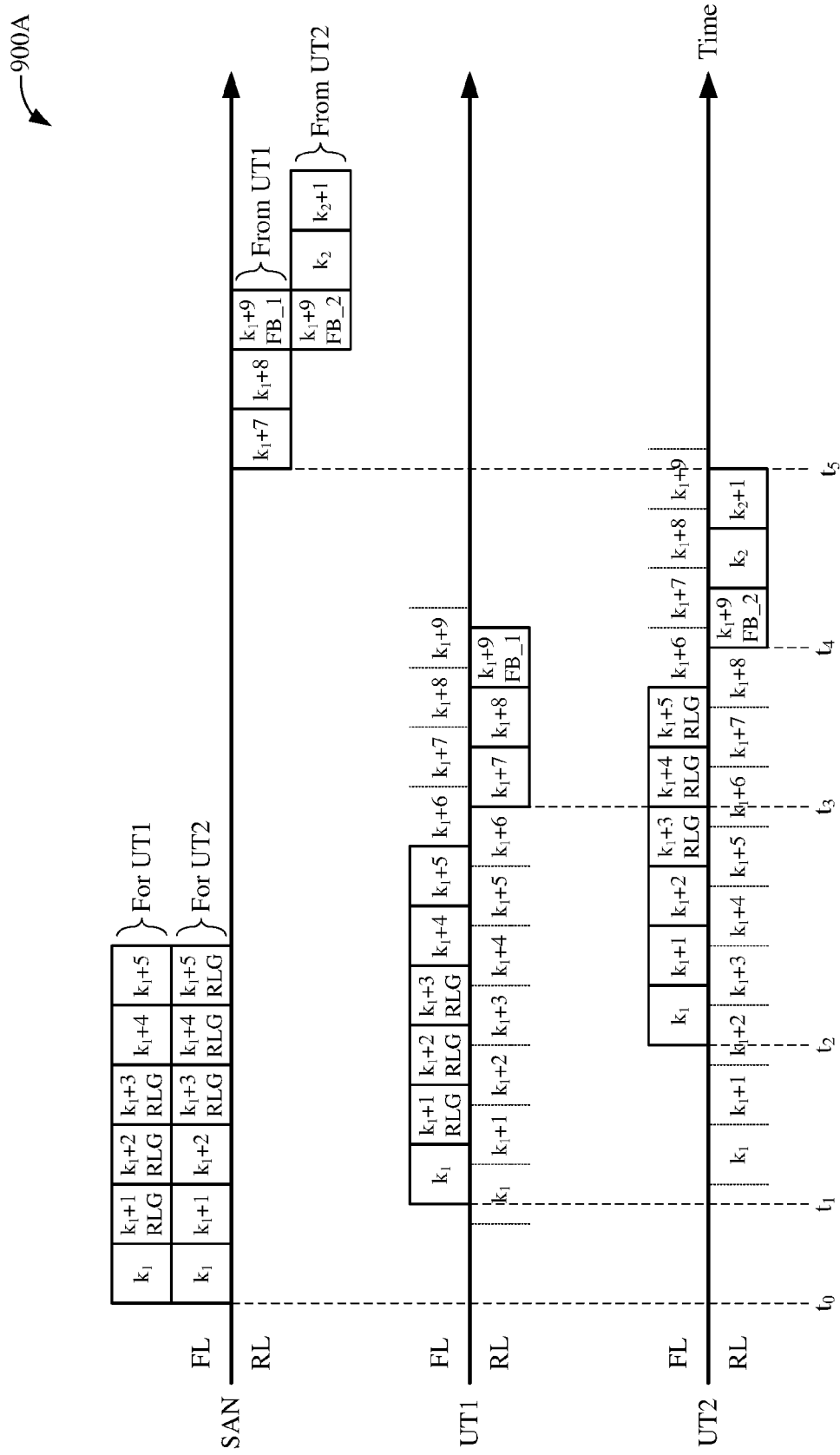
FIG. 9A shows an example timing diagram depicting a 6-3 distribution of FL/RL subframes in accordance with example implementations.

FIG. 9A shows an example timing diagram 900A depicting a 6-3 distribution of FL/RL subframes in accordance with example implementations. More specifically, the timing diagram 900A shows a SAN in communication with user terminals UT1 and UT2 via a satellite communication system (not shown for simplicity). For example, the SAN may be an embodiment of SAN 150 of FIG. 1, and the user terminals UT1 and UT2 may be embodiments of UT1 and UT2, respectively, of FIG. 7.

In example implementations, the SAN (or scheduler) may provision a communication frame into six FL subframes and three RL subframes. For example, the six FL subframes for each of the user terminals UT1 and UT2 may be allocated on the first six subframe slots ($k_1$ through $k_1+5$) of the current communication cycle. The three RL subframes allocated for UT1 may coincide with the last three subframe slots ($k_1+7$ through $k_1+9$) of the current communication cycle. Due to the relative locations of each user terminal UT1 and UT2 before and after switching from the forward service link to the reverse service link, UT2 may experience a much more significant change (e.g., reduction) in propagation delay than UT1 as a result of the switch. Therefore, the SAN (or scheduler) may be able to allocate only the last subframe slot ($k_1$+9) of the current communication cycle for RL transmissions by UT2. The remaining two RL subframes for UT2 may be allocated on the first two subframe slots ($k_2$ and $k_2$+1) of a subsequent communication cycle.

Each of the FL subframes may be preceded by a respective FL grant, and each of the RL subframes may be associated with a respective RL grant (e.g., carried by one or more of the FL subframes). As described above with respect to FIG. 8, each RL grant may allocate a subframe slot that occurs 6 subframe slots later than the subframe slot in which the RL grant is transmitted. For example, as shown in FIG. 9A, the RL subframes of UT1 (e.g., coinciding with subframe slots $k_1$+7 through $k_1$+9) may be allocated by respective RL grants provided with the second, third, and fourth FL subframes (e.g., coinciding with subframe slots $k_1$+1 through $k_1$+3). Similarly, the RL subframes of UT2 (e.g., coinciding with subframe slots $k_1$+9 through $k_2$+1) may be allocated by respective RL grants provided with the fourth, fifth, and sixth FL subframes (e.g., coinciding with subframe slots $k_1$+3 through $k_1$+5).

The SAN transmits the FL subframes to UT1 and UT2, at time $t_0$, via respective forward service links of the satellite communication system. Due to propagation delays in the satellite communication system, UT1 (located at or near the center of the source beam) receives the FL subframes at time $t_1$ and UT2 (located at or near the edge of the source beam) receives the FL subframes at time $t_2$. Each of the user terminals UT1 and UT2 may check the data sent via the FL subframes (e.g., based on CRC and/or FEC information) to determine whether each FL subframe is received correctly (e.g., and to fix any correctable errors in the received data). The user terminals UT1 and UT2 may then generate HARQ feedback information (FB_1 and FB_2, respectively) indicating which, if any, of the FL subframes were received correctly and/or requesting retransmission of any FL subframes that were not correctly received. In some aspects, the user terminals UT1 and UT2 may generate HARQ feedback information for individual transport blocks within a received FL subframe.

Upon receiving the FL subframes of a given communication frame, UT1 may detect RL grants provided with the second, third, and fourth FL subframes (e.g., coinciding with subframe slots $k_1$+1 through $k_1$+3) to determine that subframe slots $k_1$+7 through $k_1$+9 have been allocated for RL transmissions by UT1. Thus, at time $t_3$, UT1 may subsequently transmit RL subframes to the SAN (e.g., on subframe slots $k_1$+7 through $k_1$+9) via a reverse service link for UT1. Similarly, UT2 may detect RL grants in the fourth, fifth, and sixth FL subframes (e.g., coinciding with subframe slots $k_1$+3 through $k_1$+5) to determine that subframe slots $k_1$+9 through $k_2$+1 have been allocated for RL transmissions by UT2. Thus, at time $t_4$, UT2 may subsequently transmit RL subframes to the SAN (e.g., on subframe slots $k_1$+9 through $k_2$+1) via a reverse service link for UT2. Due to propagation delays in the satellite communication system, the SAN receives the RL subframes (e.g., on subframe slots $k_1$+7 through $k_2$+1) from the user terminals UT1 and UT2 at time $t_5$.

For some implementations, each of the user terminals UT1 and UT2 may be configured to transmit the HARQ feedback information via the last RL subframe (e.g., coinciding with subframe slot $k_1$+9) of a given communication cycle. As described above, the feedback information may include a block A/N message indicating an ACK or NACK for six previous FL subframes. Still further, for some implementations, the block A/N message may include ACK/NACK information for the first four FL subframes (e.g., coinciding with subframe slots $k_1$ through $k_1$+3) of the current communication frame and the last two FL subframes from a previous communication frame (not shown for simplicity).

Figure 9B:
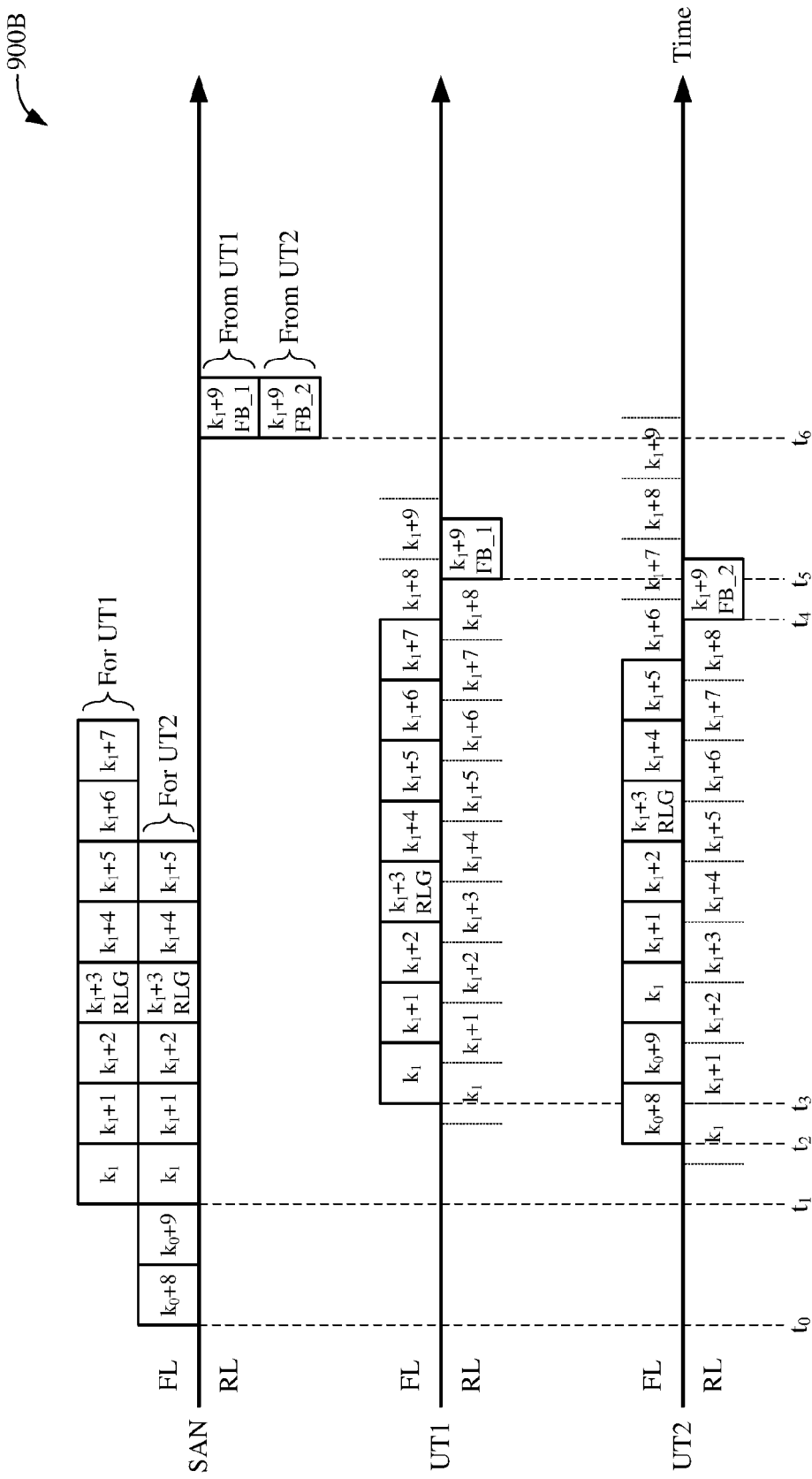
FIG. 9B shows an example timing diagram depicting an 8-1 distribution of FURL subframes in accordance with example implementations.

FIG. 9B shows an example timing diagram 900B depicting an 8-1 distribution of FL/RL subframes in accordance with example implementations. More specifically, the timing diagram 900B shows a SAN in communication with user terminals UT1 and UT2 via a satellite communication system (not shown for simplicity). For example, the SAN may be an embodiment of SAN 150 of FIG. 1, and the user terminals UT1 and UT2 may be embodiments of UT1 and UT2, respectively, of FIG. 7.

In example implementations, the SAN (or scheduler) may provision a communication frame into eight FL subframes and one RL subframe. For example, the RL subframe allocated for each of the user terminals UT1 and UT2 may coincide with the tenth or final subframe slot ($k_1$+9) of the current communication cycle. The eight FL subframes for UT1 may be allocated on the first eight subframe slots ($k_1$ through $k_1$+7) of the current communication cycle. Due to the relative locations of each user terminal UT1 and UT2 before and after switching from the forward service link to the reverse service link, UT2 may experience a much more significant change (e.g., reduction) in propagation delay than UT1 as a result of the switch. Therefore, the SAN (or scheduler) may be able to allocate only the first six subframe slots ($k_1$ through $k_1$+5) of the current communication cycle for FL transmissions to UT2. The remaining two FL subframes for UT2 may be allocated on the last two subframe slots ($k_0$+8 and $k_0$+9) of a previous communication cycle (e.g., preceding subframe slot $k_1$).

Each of the FL subframes may be preceded by a respective FL grant, and each of the RL subframes may be associated with a respective RL grant (e.g., carried by one or more of the FL subframes). As described above with respect to FIG. 8, each RL grant may allocate a subframe slot that occurs 6 subframe slots later than the subframe slot in which the RL grant is transmitted. For example, as shown in FIG. 9B, the single RL subframe (e.g., conceding with subframe slot $k_1$+9) for each of the user terminals UT1 and UT2 may be allocated by a respective RL grant provided with the fourth FL subframe (e.g., coinciding with subframe slot $k_1$+3).

The SAN transmits FL subframes to UT2, at time $t_0$, via a forward service link for UT2. Due to propagation delays in the satellite communication system, UT2 (located at or near the edge of the source beam) receives the FL subframes at time $t_2$. The SAN further transmits FL subframes to UT1, at time $t_1$, via a forward service link for UT1. Due to propagation delays in the satellite communication system, UT1 (located at or near the center of the source beam) receives the FL subframes at time $t_3$. Each of the user terminals UT1 and UT2 may check the data sent via the FL subframes (e.g., based on CRC and/or FEC information) to determine whether each FL subframe is received correctly (e.g., and to fix any correctable errors in the received data). The user terminals UT1 and UT2 may then generate HARQ feedback information (FB_1 and FB_2, respectively) indicating which, if any, of the FL subframes were received correctly and/or requesting retransmission of any FL subframes that were not correctly received. In some aspects, the user terminals UT1 and UT2 may generate HARQ feedback information for individual transport blocks within a received FL subframe.

Upon receiving the FL subframes of a given communication frame, UT1 may detect an RL grant provided with its fourth FL subframe (e.g., coinciding with subframe slot $k_1+3$) to determine that subframe slot $k_1+9$ has been allocated for RL transmissions by UT1. Thus, at time $t_5$, UT1 may subsequently transmit an RL subframe to the SAN (e.g., on subframe slot $k_1+9$) via a reverse service link for UT1. Similarly, UT2 may detect an RL grant provided with its sixth FL subframe (e.g., coinciding with subframe slot $k_1+3$) to determine that subframe slot $k_1+9$ has been allocated for RL transmission by UT2. Thus, at time $t_4$, UT2 may subsequently transmit an RL subframe to the SAN (e.g., on subframe slot $k_1+9$) via a reverse service link for UT2. Due to propagation delays in the satellite communication system, the SAN receives the RL subframes (e.g., on subframe slot $k_1+9$) from the user terminals UT1 and UT2 at time t6.

For some implementations, each of the user terminals UT1 and UT2 may be configured to transmit the HARQ feedback information via the single RL subframe (e.g., coinciding with subframe slot $k_1+9$) of a given communication cycle. As described above, the feedback information may include a block A/N message indicating an ACK or NACK for eight previous FL subframes. Still further, for some implementations, the block A/N message may include ACK/NACK information for the first four FL subframes (e.g., coinciding with subframe slots $k_1$ through $k_1+3$) of the current communication frame and the last four FL subframes from a previous communication frame (not shown for simplicity).

Although described with respect to half-duplex communications, the systems and methods of asymmetric FL/RL resource allocation may also be implemented by UTs capable of full-duplex operation with little or no modification to the examples described herein. Among other benefits, the example implementations may provide increased FL data throughput by asymmetrically allocating FL and RL subframes of a given communication frame. Furthermore, the asymmetric FL/RL subframe distribution may increase the overall subframe utilization of each communication frame compared to conventional symmetric FL/RL subframe distributions (e.g., 90% subframe utilization compared to 80% subframe utilization). Moreover, HARQ processes may be maintained, with little or no modification to existing PRCCH control formats, when implementing the asymmetric subframe distribution techniques described herein.

Figure 10:
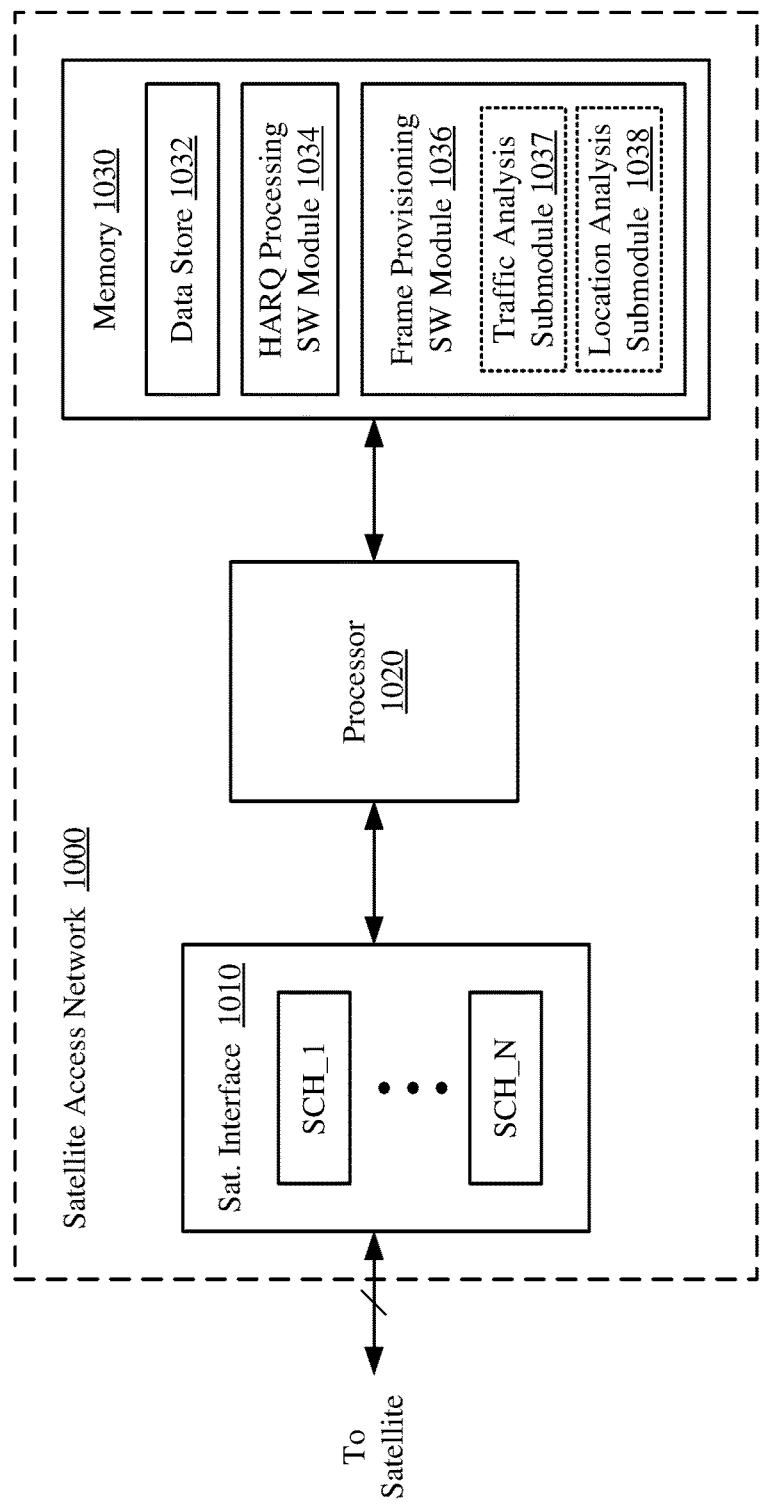
FIG. 10 is a block diagram of an example satellite access network (SAN) in accordance with example implementations.

FIG. 10 is a block diagram of an example satellite access network (SAN) 1000 in accordance with example implementations. For purposes of discussion herein, the SAN 1000 may be an example of (or implemented within) the SAN 150 of FIG. 1. The SAN 1000 includes a satellite interface 1010, a processor 1020, and memory 1030. The satellite interface 1010 may be configured to communicate with a particular satellite (e.g., satellite 300 of FIG. 1). Furthermore, the satellite interface 1010 may include a number of schedulers SCH_1-SCH_N that control and/or schedule communications via respective beams of the satellite (e.g., as described above with respect to FIG. 7). For some implementations, the SAN 1000 may include other circuitry and/or components in addition to those shown in FIG. 10.

Memory 1030 includes a data store 1032 that may store outgoing data to be transmitted to a user terminal via a forward link of a satellite communication system. The outgoing data may be associated with ongoing HARQ processes maintained by one or more of the schedulers SCH_1-SCH_N. The memory 1030 may also include a non-transitory computer-readable storage medium (e.g., one or more nonvolatile memory elements, such as EPROM, EEPROM, Flash memory, a hard drive, and so on) that may store the following software (SW) modules:

a HARQ processing SW module 1034 to process HARQ feedback information, received via a reverse link of the satellite communication system, for the outgoing data stored in the data store 1032; and
  a frame provisioning SW module 1036 to provision a communication frame, for the user terminal, into a number of FL subframes and RL subframes, the frame provisioning SW module 1036 including:
    a traffic analysis submodule 1037 to determine the number of FL subframes and RL subframes to be allocated for the given communication frame based at least in part on a proportion of FL data traffic and RL data traffic communicated, and/or scheduled for communications, between the SAN 1000 and the user terminal; and
    a location analysis submodule 1038 to determine an allocation of FL grants and RL grants for the given communication frame based at least in part on a location of the user terminal relative to a satellite of the satellite communication system.

Each software module includes instructions that, when executed by processor 1020, cause the SAN 1000 to perform the corresponding functions. The non-transitory computer-readable medium of memory 1030 thus includes instructions for performing all or a portion of the operations of FIG. 12.

Processor 1020 may be any suitable one or more processors capable of executing scripts or instructions of one or more software programs stored in the SAN 1000 (e.g., within memory 1030). For example, processor 1020 may execute the HARQ processing SW module 1034 to process HARQ feedback information, received via a reverse link of the satellite communication system, for the outgoing data stored in the data store 1032. Processor 1020 may also execute the frame provisioning SW module 1036 to provision a communication frame, for a user terminal, into a number of FL subframes and RL subframes. For at least some implementations, the number of FL subframes may be different than the number of RL subframes. Further, in executing the frame provisioning SW module 1036, the processor 1020 may further execute the traffic analysis submodule 1037 and/or the location analysis submodule 1038.

The processor 1020 may execute the traffic analysis submodule 1037 to determine the number of FL subframes and RL subframes to be allocated for the given communication frame based at least in part on a proportion of FL data traffic and RL data traffic communicated, and/or scheduled for communications, between the SAN 1000 and the user terminal. The processor 1020 may execute the location analysis submodule 1038 to determine an allocation of FL grants and RL grants for the given communication frame based at least in part on a location of the user terminal relative to a satellite of the satellite communication system. For at least some implementations, the functions performed by executing the frame provisioning SW module 1036, the traffic analysis submodule 1037, and/or the location analysis submodule 1038 may correspond to and/or may be performed by the FP logic 152 of FIG. 1.

Figure 11:
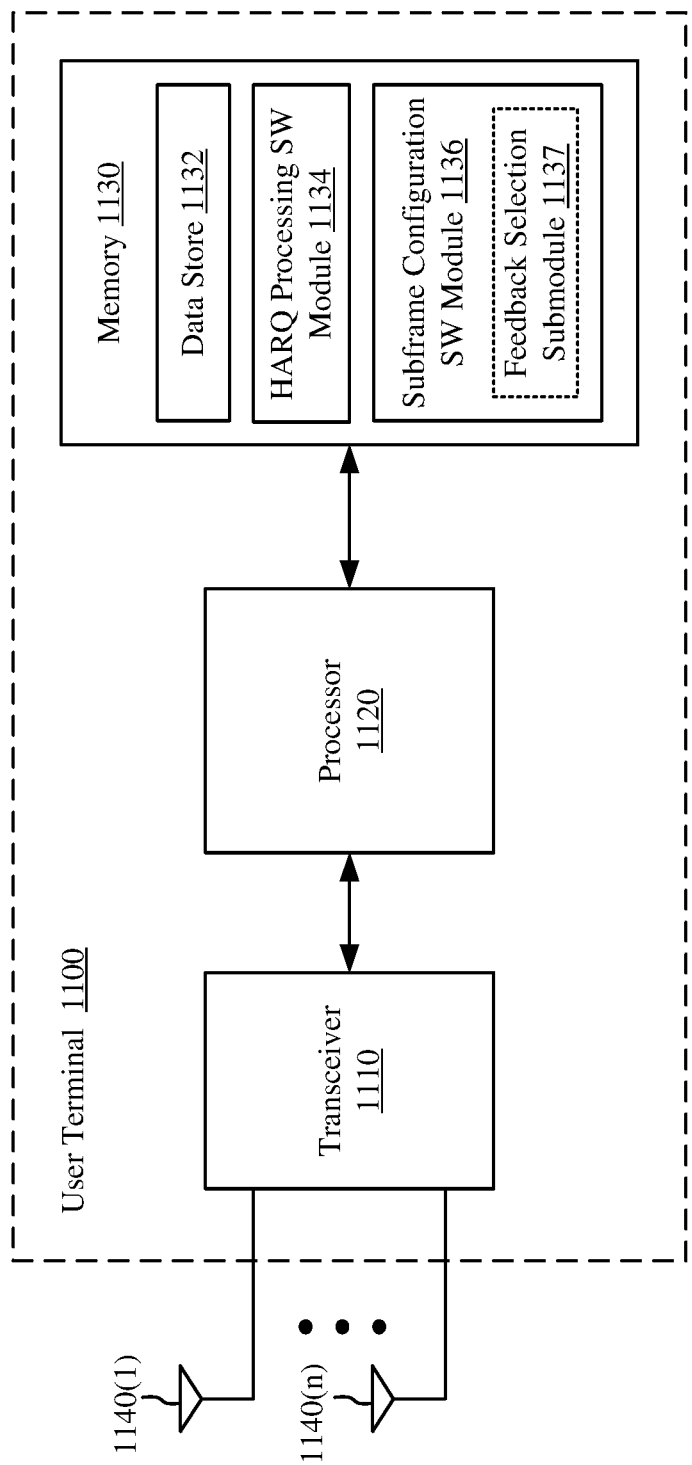
FIG. 11 shows a block diagram of an example user terminal in accordance with some implementations.

FIG. 11 shows a block diagram of an example user terminal 1100 in accordance with some implementations. The user terminal 1100 may be one implementation of any of the UTs 400 and/or 401 of FIGS. 1 and 4. The user terminal 1100 includes a transceiver 1110, a processor 1120, a memory 1130, and one or more antennas 1140(1)-1140(n). The transceiver 1110 may be used to transmit signals to and receive signals from satellites, UEs, and/or other suitable wireless devices. In some aspects, the transceiver 1110 may include any number of transceiver chains (not shown for simplicity) that may be coupled to any suitable number of antennas 1140(1)-1140(n). Although not shown in FIG. 11 for simplicity, the user terminal 1100 may include antenna selection logic to selectively couple the transceiver chains of transceiver 1110 to antennas 1140(1)-1140(n).

Memory 1130 includes a data store 1132 that may store incoming data received from a SAN via a forward link of a satellite communication system. The incoming data may be associated with ongoing HARQ processes maintained by the SAN (e.g., by one or more of the schedulers SCH_1-SCH_N of FIG. 10). The memory 1130 may also include a non-transitory computer-readable medium (e.g., one or more nonvolatile memory elements, such as EPROM, EEPROM, Flash memory, a hard drive, etc.) that may store at least the following software (SW) modules:

- a HARQ processing SW module 1134 to generate HARQ feedback information (e.g., ACK or NACK) for the incoming data stored in the data store 1132; and
- a subframe configuration SW module 1136 to determine a number of RL subframes provisioned for a communication frame scheduled by the SAN, the RL configuration SW module 1136 including:
  - a feedback selection submodule 1137 to select one of the RL subframes to include HARQ feedback information for a number of previously-received FL subframes.

Each software module includes instructions that, when executed by processor 1120, cause the user terminal 1100 to perform the corresponding functions. The non-transitory computer-readable medium of memory 1130 thus includes instructions for performing all or a portion of the operations of FIG. 13.

Processor 1120 may be any suitable one or more processors capable of executing scripts or instructions of one or more software programs stored in the user terminal 1100 (e.g., within memory 1130). For example, processor 1120 may execute the HARQ processing SW module 1134 to generate HARQ feedback information (e.g., ACK or NACK) for the incoming data stored in the data store 1132. Processor 1120 may also execute the subframe configuration SW module 1136 to determine a number of RL subframes provisioned for a communication frame scheduled by the SAN. For at least some implementations, the number of RL subframes may be different than a number of FL subframes provisioned for the given communication frame. In executing the RL configuration SW module 1136, the processor 1120 may further execute the feedback selection submodule 1137 to select one of the RL subframes to include HARQ feedback information for a number of previously-received FL subframes. For at least some implementations, the functions performed by executing the subframe configuration SW module 1136 and/or the feedback selection submodule 1137 may correspond to and/or may be performed by the SFC circuit 425 of FIG. 1.

Figure 12:
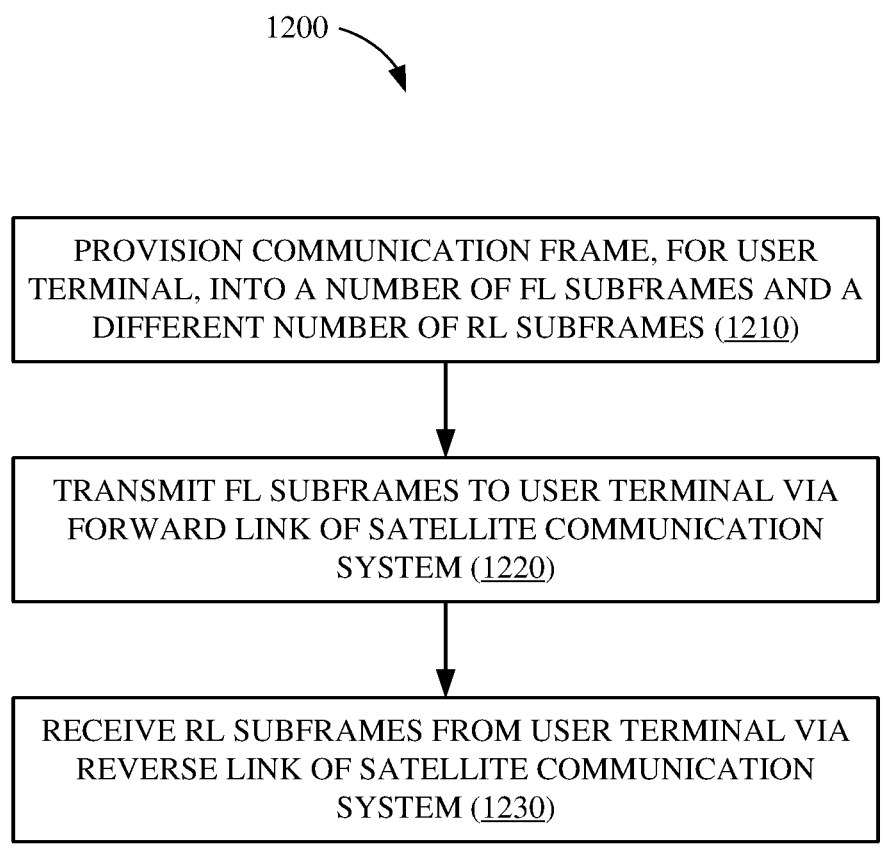
FIG. 12 shows an illustrative flowchart depicting an example operation for dynamically scheduling communications between a SAN and a user terminal.

FIG. 12 shows an illustrative flowchart depicting an example operation 1200 for dynamically scheduling communications between a SAN and a user terminal. The example operation 1200 may be performed by the SAN 1000 depicted in FIG. 10. However, it is to be understood that operation 1200 may be performed by other suitable SANs and/or by any suitable components of the SAN 150 of FIG. 1.

First, the SAN 1000 may provision a communication frame, for a particular user terminal, into a number of FL subframes and a different number of RL subframes (1210). As described above, with respect to FIG. 7, a conventional (e.g., "symmetric") allocation of FL subframes and RL subframes may not be optimal for satellite communications (e.g., where FL data traffic often outweighs RL data traffic). Thus, for some implementations, the SAN 1000 may allocate FL subframes and RL subframes, of a given communication frame, in an asymmetric fashion based at least in part on a proportion of FL data traffic and RL data traffic communicated, and/or scheduled for communications, with the user terminal.

For example, if the amount of FL data traffic is expected to exceed the amount of RL data traffic, the SAN 1000 may allocate more FL subframes (e.g., and fewer RL subframes) for a given communication frame. On the other hand, if the amount of RL data traffic is expected to exceed the amount of FL data traffic, the SAN 1000 may allocate more RL subframes (e.g., and fewer FL subframes) for a given communication frame. Due to the asymmetric allocation of FL and RL subframes, at least one RL subframe may be configured to provide HARQ feedback information for multiple FL subframes. For some implementation, a single RL subframe may be configured to provide a block A/N message that includes ACK/NACK information for multiple FL subframes previously transmitted by the SAN 1000.

The SAN 1000 may then transmit the FL subframes to the user terminal via a forward link of a corresponding satellite communication system (1220). Each of the FL subframes may be preceded by a respective FL grant. For some implementations, the SAN 1000 may selectively allocate the FL grants based at least in part on a location of the user terminal relative to a satellite of the satellite communication system (e.g., or a delay associated with the user terminal in switching between communications on the forward link and the reverse link). More specifically, the SAN 1000 may determine which FL subframes are to be allocated on which subframe slots of a given communication cycle.

For example, as described above with reference to FIGS. 7 and 9B, UT2 may experience a much more significant change (e.g., reduction) in propagation delay than UT1 as a result of switching communications from the forward service link to the reverse service link. Accordingly, the SAN may allocate all eight FL subframes scheduled for UT1 on the first eight subframe slots ($k_1$ through $k_1+7$) of the current communication cycle. However, of the eight FL subframes scheduled for UT2, the SAN may allocate two of the FL subframes on the last two subframe slots ($k_0+8$ and $k_0+9$) of a previous communication cycle and the remaining six FL subframes on the first six subframe slots ($k_1$ through $k_1+5$) of the current communication cycle.

Thereafter, the SAN 1000 may receive RL subframes from the user terminal via a reverse link of the satellite communication system (1230). Each of the RL subframes may be triggered by a respective FL grant sent to the user terminal with one or more of the FL subframes. For some implementations, the SAN 1000 may selectively allocate the RL grants based at least in part on a location of the user terminal relative to a satellite of the satellite communication system (e.g., or a delay associated with the user terminal in switching between communications on the forward link and the reverse link). More specifically, the SAN 1000 may determine which RL subframes are to be allocated on which subframe slots of a given communication cycle.

For example, as described above with reference to FIGS. 7 and 9A, UT2 may experience a much more significant change (e.g., reduction) in propagation delay than UT1 as a result of switching communications from the forward service link to the reverse service link. Accordingly, the SAN may allocate all three RL subframes scheduled for UT1 on the last three subframe slots ($k_1+7$ through $k_1+9$) of the current communication cycle. However, of the three RL subframes scheduled for UT2, the SAN may allocate one of the RL subframes on the last subframe slot ($k_1+9$) of the current communication cycle and the remaining two RL subframes on the first two subframe slots ($k_2$ and $k_2+1$) of a subsequent communication cycle.

Figure 13:
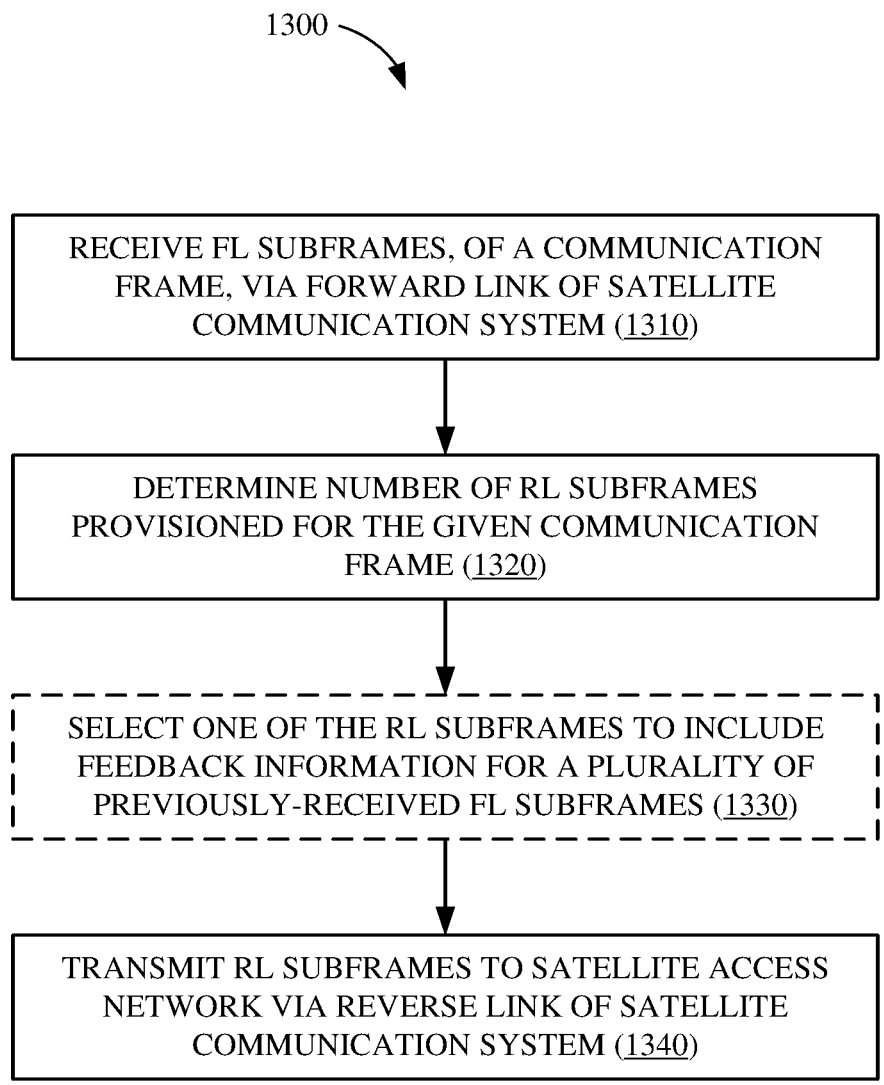
FIG. 13 shows an illustrative flowchart depicting an example operation for dynamically configuring communications from a user terminal to a SAN.

FIG. 13 shows an illustrative flowchart depicting an example operation 1300 for dynamically configuring communications from a user terminal to a SAN. The example operation 1300 may be performed by the user terminal depicted in FIG. 11. However, it is to be understood that operation 1300 may be performed by other suitable user terminals and/or any suitable devices capable of receiving forward-link communications from the satellite 300 of FIG. 1.

First, the user terminal 1100 may receive FL subframes, of a communication frame, via a forward link of a satellite communication system (1310). For example, each of the FL subframes may be preceded by a FL grant. In some implementations, the number of FL subframes may be dynamically provisioned (e.g., by the SAN) for the given communication frame based at least in part on a proportion of FL data traffic and RL data traffic communicated, and/or scheduled for communications, between the SAN and the user terminal 1100. The user terminal 1100 may check the data provided in the FL subframes to determine whether each FL subframe is received correctly. The user terminal 1100 may generate HARQ feedback information (e.g., ACK or NACK) indicating which, if any, of the FL subframes were received correctly and/or to request retransmission of any FL subframes that were not correctly received by the user terminal 1100.

The user terminal 1100 may then determine a number of RL subframes provisioned for the given communication frame (1320). For example, one or more of the FL subframes may include an RL grant that may allocate a respective subframe slot (e.g., of a given communication cycle) on which the user terminal 1100 may transmit an RL subframe. Each RL grant may allocate a respective RL subframe to be transmitted a number of (e.g., six) subframe slots later than the subframe slot on which the RL grant was received. For example, with reference to FIG. 8, the UT may detect RL grants in the third and fourth FL subframes (e.g., coinciding with subframe slots k+2 and k+3, respectively) to determine that the ninth and tenth subframe slots (k+8 and k+9) of current communication cycle have been allocated for RL transmissions. In some implementations, the number of RL subframes may be different than the number of FL subframes.

In at least one implementation, the user terminal 1100 may select one of the RL subframes to include feedback information for a plurality of previously-received FL subframes (1330). For example, due to the asymmetric allocation of FL and RL subframes, a single RL subframe may be configured to provide HARQ feedback information for multiple FL subframes. In some implementations, the HARQ feedback information may comprise a single block A/N message indicating a respective ACK or NACK for the total number (N) of FL subframes allocated for a given communication frame. In some aspects, the block A/N message may include ACK/NACK information for one or more FL subframes of the current communication frame and/or one or more FL subframes of a previous communication frame. The user terminal 1100 may determine which of the RL subframes (e.g., within the given communication frame) is to include the feedback information for the plurality of FL subframes based at least in part on RRC information received from the SAN.

In at least one embodiment, the user terminal 1100 may select one of the RL subframes to include the block A/N message based at least in part on a location of the user terminal 1100 relative to a satellite of the satellite communication system (e.g., or a delay associated with the user terminal in switching between communications on the forward link and the reverse link). For example, as described above with respect to FIG. 9A, UT1 may select the last RL subframe (e.g., coinciding with subframe slot $k_1+9$) of the associated communication frame to include its block A/N message FB_1. On the other hand, UT2 may select the first RL subframe (e.g., also coinciding with subframe slot $k_1+9$) of the associated communication frame to include its block A/N message FB_2. Thus, in some aspects, the user terminal 1100 may select the RL subframe coinciding with the last subframe slot (e.g., subframe slot $k_i+9$) of the current communication cycle to include the block A/N message for a given communication frame.

Finally, the user terminal 1100 may transmit the RL subframes to the SAN via a reverse link of the satellite communication system (1340). As described above, at least one of the RL subframes may include a block A/N message for multiple FL subframes. In some aspects, multiple ACK/NACK bits may be bundled together (e.g., using a logical AND operator) to reduce the overhead of the block A/N message. Still further, in some aspects, certain HARQ feedback information may be dropped from a given RL subframe to make room for the block A/N message (e.g., if the given control format cannot support such HARQ information in addition to the block A/N message).

Figure 14:
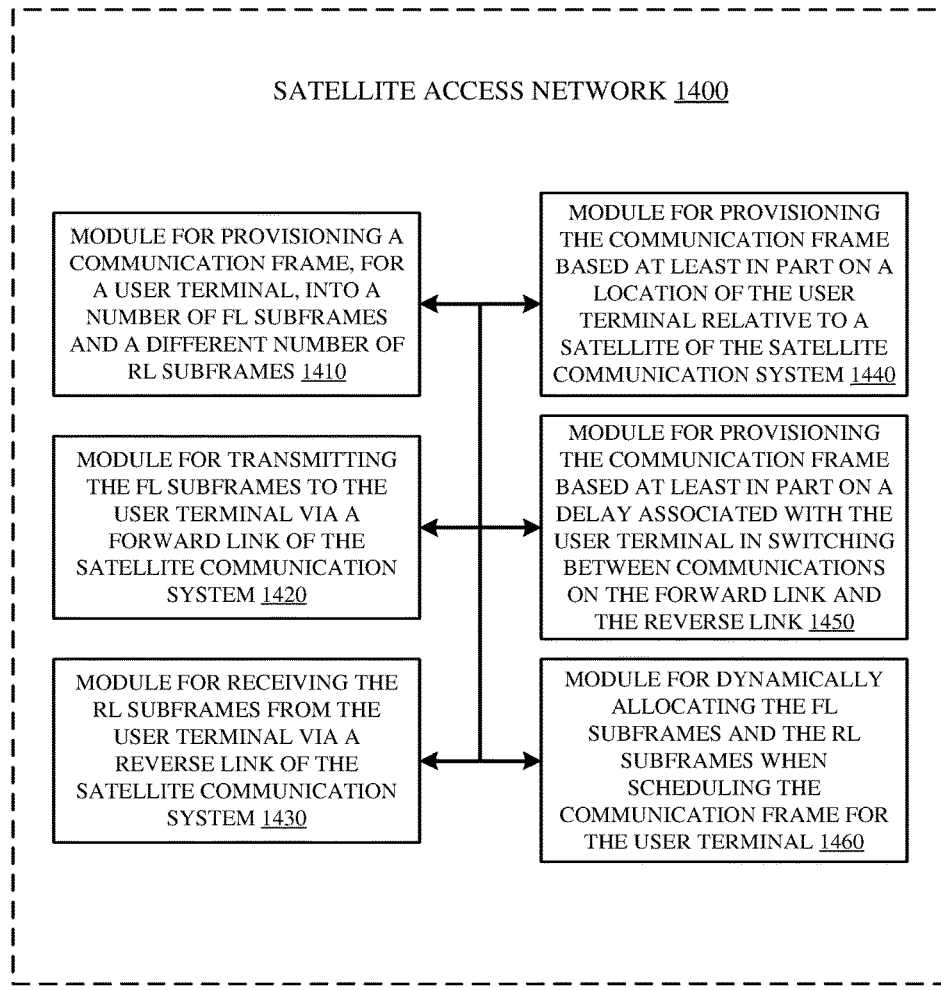
FIG. 14 shows an example satellite access network represented as a series of interrelated functional modules.

FIG. 14 shows an example satellite access network 1400 represented as a series of interrelated functional modules. A module 1410 for provisioning a communication frame, for a user terminal, into a number of FL subframes and a different number of RL subframes may correspond at least in some aspects to, for example, a processor as discussed herein (e.g., processor 1020) and/to a scheduler as discussed herein (e.g., one of schedulers SCH_1-SCH_N). A module 1420 for transmitting the FL subframes to the user terminal via a forward link of a satellite communication system may correspond at least in some aspects to, for example, a processor as discussed herein (e.g., processor 1020) and/to a scheduler as discussed herein (e.g., one of schedulers SCH_1-SCH_N). A module 1430 for receiving the RL subframes from the user terminal via a reverse link of the satellite communication system may correspond at least in some aspects to, for example, a processor as discussed herein (e.g., processor 1020) and/to a scheduler as discussed herein (e.g., one of schedulers SCH_1-SCH_N).

A module 1440 for provisioning the communication frame based at least in part on a location of the user terminal relative to a satellite of the satellite communication system may correspond at least in some aspects to, for example, a processor as discussed herein (e.g., processor 1020) and/to a scheduler as discussed herein (e.g., one of schedulers SCH_1-SCH_N). A module 1450 for provisioning the communication frame based at least in part on a delay associated with the user terminal in switching between communications on the forward link and the reverse link may correspond at least in some aspects to, for example, a processor as discussed herein (e.g., processor 1020) and/to a scheduler as discussed herein (e.g., one of schedulers SCH_1-SCH_N). A module 1460 for dynamically allocating the FL subframes and the RL subframes when scheduling the communication frame for the user terminal may correspond at least in some aspects to, for example, a processor as discussed herein (e.g., processor 1020) and/to a scheduler as discussed herein (e.g., one of schedulers SCH_1-SCH_N).

Figure 15:
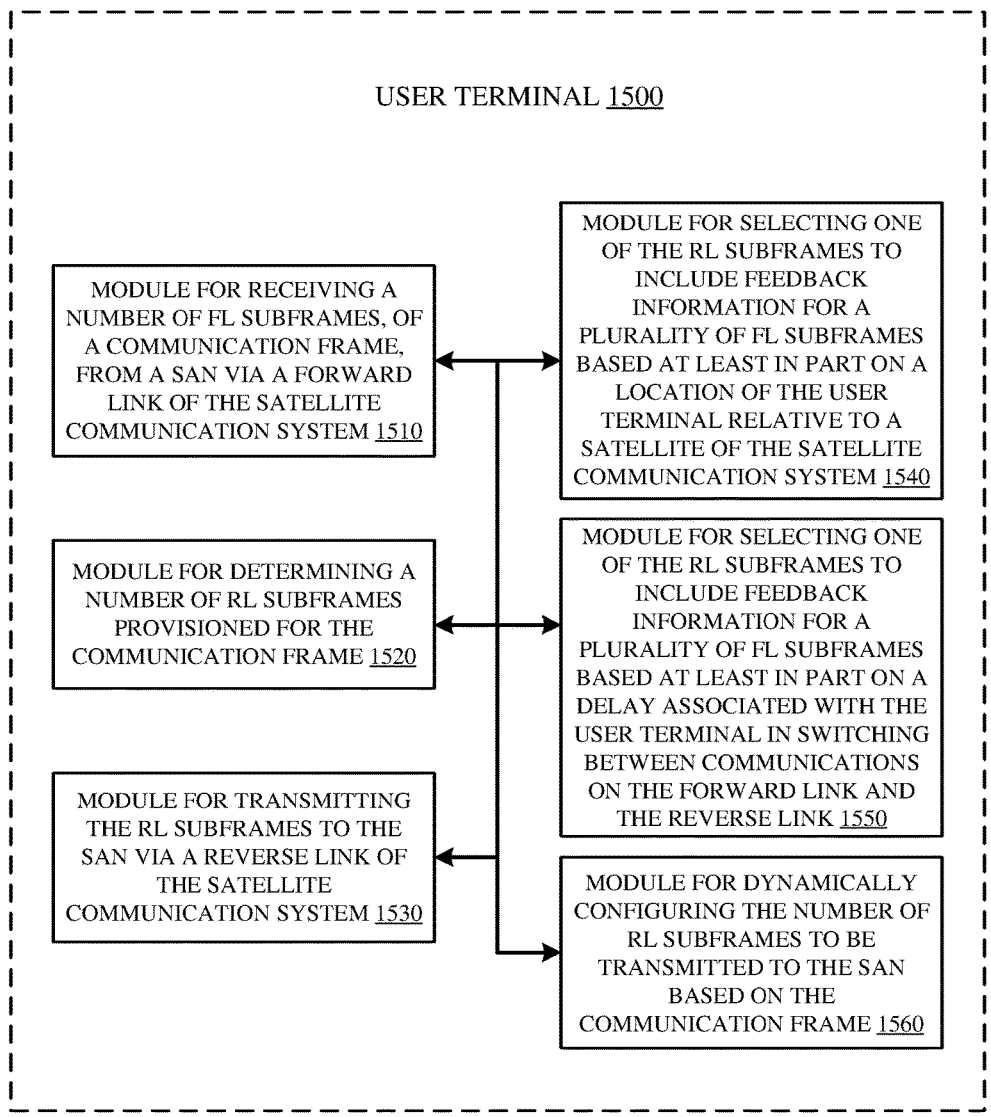
FIG. 15 shows an example user terminal represented as a series of interrelated functional modules.

FIG. 15 shows an example user terminal 1500 represented as a series of interrelated functional modules. A module 1510 for receiving a number of FL subframes, of a communication frame, from a SAN via a forward link of a satellite communication system may correspond at least in some aspects to, for example, a processor as discussed herein (e.g., processor 1120) and/to a transceiver as discussed herein (e.g., transceiver 1110). A module 1520 for determining a number of RL subframes provisioned for the communication frame may correspond at least in some aspects to, for example, a processor as discussed herein (e.g., processor 1120). A module 1530 for transmitting the RL subframes to the SAN via a reverse link of the satellite communication system may correspond at least in some aspects to, for example, a processor as discussed herein (e.g., processor 1120) and/to a transceiver as discussed herein (e.g., transceiver 1110).

A module 1540 for selecting one of the RL subframes to include feedback information for a plurality of FL subframes based at least in part on a location of the user terminal relative to a satellite of the satellite communication system may correspond at least in some aspects to, for example, a processor as discussed herein (e.g., processor 1120). A module 1550 for selecting one of the RL subframes to include feedback information for a plurality of FL subframes based at least in part on a delay associated with the user terminal in switching between communications on the forward link and the reverse link may correspond at least in some aspects to, for example, a processor as discussed herein (e.g., processor 1120). A module 1560 for dynamically configuring the number of RL subframes to be transmitted to the SAN based on the communication frame may correspond at least in some aspects to, for example, a processor as discussed herein (e.g., processor 1120) and/to a transceiver as discussed herein (e.g., transceiver 1110).

The functionality of the modules of FIGS. 14 and 15 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 14 and 15, as well as other components and functions described herein, may be implemented using any suitable means. Such means also may be implemented, at least in part, using corresponding structure as taught herein. For example, the components described above in conjunction with the "module for" components of FIGS. 14 and 15 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method of operating a satellite access network (SAN) of a satellite communication system, the method comprising:

provisioning a communication frame, for a user terminal, into a number of forward-link (FL) subframes and a different number of reverse-link (RL) subframes, wherein the last subframe of the communication frame is a RL subframe including hybrid automatic repeat request (HARQ) feedback information for a plurality of FL subframes previously transmitted by the SAN to the user terminal;

transmitting the FL subframes to the user terminal via a forward link of the satellite communication system; and receiving the RL subframes from the user terminal via a reverse link of the satellite communication system.

2. The method of claim 1, wherein the number of FL subframes is greater than the number of RL subframes.

3. The method of claim 1, further comprising:

communicating radio resource control (RRC) information to the user terminal indicating which of the RL subframes is to include the HARQ feedback information for the plurality of FL subframes.

4. The method of claim 1, wherein the last subframe of the communication frame includes HARQ feedback information for one or more FL subframes of a previous communication frame.

5. The method of claim 1, wherein the provisioning is based at least in part on a location of the user terminal relative to a satellite of the satellite communication system.

6. The method of claim 1, wherein the provisioning is based at least in part on a delay associated with the user terminal in switching between communications on the forward link and the reverse link.

7. The method of claim 1, wherein the provisioning comprises:

dynamically allocating the FL subframes and the RL subframes when scheduling the communication frame for the user terminal.

8. A satellite access network (SAN) comprising:

one or more processors; and a memory configured to store instructions that, when executed by the one or more processors, cause the SAN to:

provision a communication frame, for a user terminal, into a number of forward-link (FL) subframes and a different number of reverse-link (RL) subframes, wherein the last subframe of the communication frame is a RL subframe including hybrid automatic repeat request (HARQ) feedback information for a plurality of FL subframes previously transmitted by the SAN to the user terminal;

transmit the FL subframes to the user terminal via a forward link of a satellite communication system; and receive the RL subframes from the user terminal via a reverse link of the satellite communication system.

9. The satellite access network of claim 8, wherein execution of the instructions further causes the SAN to:

communicate radio resource control (RRC) information to the user terminal indicating which of the RL subframes is to include the HARQ feedback information for the plurality of FL subframes.

10. The satellite access network of claim 8, wherein the last subframe of the communication frame includes HARQ feedback information for one or more FL subframes of a previous communication frame.

11. The satellite access network of claim 8, wherein the SAN is to provision the communication frame based at least in part on a location of the user terminal relative to a satellite of the satellite communication system or a delay associated with the user terminal in switching between communications on the forward link and the reverse link.

12. The satellite access network of claim 8, wherein execution of the instructions to provision the communication frame causes the SAN to:

dynamically allocate the FL subframes and the RL subframes when scheduling the communication frame for the user terminal.

13. A satellite access network (SAN) comprising:

means for provisioning a communication frame, for a user terminal, into a number of forward-link (FL) subframes and a different number of reverse-link (RL) subframes, wherein the last subframe of the communication frame is a RL subframe including hybrid automatic repeat request (HARQ) feedback information for a plurality of FL subframes previously transmitted by the SAN to the user terminal;

means for transmitting the FL subframes to the user terminal via a forward link of a satellite communication system; and means for receiving the RL subframes from the user terminal via a reverse link of the satellite communication system.

14. The satellite access network of claim 13, further comprising:

radio resource control (RRC) information to the user terminal indicating which of the RL subframes is to include the HARQ feedback information for the plurality of FL subframes.

15. The satellite access network of claim 13, wherein the last subframe of the communication frame includes HARQ feedback information for one or more FL subframes of a previous communication frame.

16. The satellite access network of claim 13, wherein the provisioning is based at least in part on a location of the user terminal relative to a satellite of the satellite communication system or a delay associated with the user terminal in switching between communications on the forward link and the reverse link.

17. The satellite access network of claim 13, wherein the means for provisioning is to:

dynamically allocate the FL subframes and the RL subframes when scheduling the communication frame for the user terminal.

18. A non-transitory computer-readable medium storing instructions that, when executed by one or more processors of a satellite access network (SAN), cause the SAN to perform operations comprising:

provisioning a communication frame, for a user terminal, into a number of forward-link (FL) subframes and a different number of reverse-link (RL) subframes, wherein the last subframe of the communication frame is a RL subframe including hybrid automatic repeat request (HARQ) feedback information for a plurality of FL subframes previously transmitted by the SAN to the user terminal;

transmitting the FL subframes to the user terminal via a forward link of a satellite communication system; and receiving the RL subframes from the user terminal via a reverse link of the satellite communication system.

19. The non-transitory computer-readable medium of claim 18, wherein execution of the instructions further causes the SAN to:

communicate radio resource control (RRC) information to the user terminal indicating which of the RL subframes is to include the HARQ feedback information for the plurality of FL subframes.

20. The non-transitory computer-readable medium of claim 18, wherein the last subframe of the communication frame includes HARQ feedback information for one or more FL subframes of a previous communication frame.

21. The non-transitory computer-readable medium of claim 18, wherein the SAN is to provision the communication frame based at least in part on a location of the user terminal relative to a satellite of the satellite communication system or a delay associated with the user terminal in switching between communications on the forward link and the reverse link.

22. The non-transitory computer-readable medium of claim 18, wherein execution of the instructions for provisioning the communication frame causes the SAN to:
dynamically allocate the FL subframes and the RL subframes when scheduling the communication frame for the user terminal.

23. A method of operating a user terminal in a satellite communication system, the method comprising:
receiving a number of forward-link (FL) subframes, of a communication frame, from a satellite access network (SAN) via a forward link of the satellite communication system;
determining a number of reverse-link (RL) subframes provisioned for the communication frame, wherein the number of RL subframes is different than the number of FL subframes; and
transmitting the RL subframes to the SAN via a reverse link of the satellite communication system, wherein the last subframe of the communication frame is a RL subframe including hybrid automatic repeat request (HARQ) feedback information for a plurality of FL subframes previously received from the SAN.

24. The method of claim 23, wherein the number of RL subframes is less than the number of FL subframes.

25. The method of claim 23, further comprising:
determining which of the RL subframes is to include the HARQ feedback information for a plurality of FL subframes based at least in part on radio resource configuration (RRC) information received from the SAN.

26. The method of claim 23, wherein the last subframe of the communication frame includes HARQ feedback information for one or more FL subframes of a previous communication frame.

27. The method of claim 23, further comprising:
selecting one of the RL subframes to include feedback information for a plurality of FL subframes based at least in part on a location of the user terminal relative to a satellite of the satellite communication system.

28. The method of claim 23, further comprising:
selecting one of the RL subframes to include feedback information for a plurality of FL subframes based at least in part on a delay associated with the user terminal in switching between communications on the forward link and the reverse link.

29. A user terminal comprising:
one or more processors; and
a memory configured to store instructions that, when executed by the one or more processors, cause the user terminal to:
receive a number of forward-link (FL) subframes, of a communication frame, from a satellite access network (SAN) via a forward link of a satellite communication system;
determine a number of reverse-link (RL) subframes provisioned for the communication frame, wherein the number of RL subframes is different than the number of FL subframes; and
transmit the RL subframes to the SAN via a reverse link of the satellite communication system, wherein the last subframe of the communication frame is a RL subframe including hybrid automatic repeat request (HARQ) feedback information for a plurality of FL subframes previously received from the SAN.

30. The user terminal of claim 29, wherein execution of the instructions further causes the user terminal to:
determine which of the RL subframes is to include the HARQ feedback information for a plurality of FL subframes based at least in part on radio resource configuration (RRC) information received from the SAN.

31. The user terminal of claim 29, wherein the last subframe of the communication frame includes HARQ feedback information for one or more FL subframes of a previous communication frame.

32. The user terminal of claim 29, wherein execution of the instructions further causes the user terminal to:
select one of the RL subframes to include feedback information for a plurality of FL subframes based at least in part on a location of the user terminal relative to a satellite of the satellite communication system.

33. The user terminal of claim 29, wherein execution of the instructions further causes the user terminal to:
select one of the RL subframes to include feedback information for a plurality of FL subframes based at least in part on a delay associated with the user terminal in switching between communications on the forward link and the reverse link.

34. A user terminal comprising:
means for receiving a number of forward-link (FL) subframes, of a communication frame, from a satellite access network (SAN) via a forward link of a satellite communication system;
means for determining a number of reverse-link (RL) subframes provisioned for the communication frame, wherein the number of RL subframes is different than the number of FL subframes; and
means for transmitting the RL subframes to the SAN via a reverse link of the satellite communication system, wherein the last subframe of the communication frame is a RL subframe including hybrid automatic repeat request (HARQ) feedback information for a plurality of FL subframes previously received from the SAN.

35. The user terminal of claim 34, further comprising:
means for determining which of the RL subframes is to include the HARQ feedback information for a plurality of FL subframes based at least in part on radio resource configuration (RRC) information received from the SAN.

36. The user terminal of claim 34, wherein the last subframe of the communication frame includes HARQ feedback information for one or more FL subframes of a previous communication frame.

37. The user terminal of claim 34, further comprising:
means for selecting one of the RL subframes to include feedback information for a plurality of FL subframes based at least in part on a location of the user terminal relative to a satellite of the satellite communication system.

38. The user terminal of claim 34, further comprising:
means for selecting one of the RL subframes to include feedback information for a plurality of FL subframes based at least in part on a delay associated with the user terminal in switching between communications on the forward link and the reverse link.

39. A non-transitory computer-readable medium storing instructions that, when executed by one or more processors of a user terminal, cause the user terminal to perform operations comprising:
   receiving a number of forward-link (FL) subframes, of a communication frame, from a satellite access network (SAN) via a forward link of a satellite communication system;
   determining a number of reverse-link (RL) subframes provisioned for the communication frame, wherein the number of RL subframes is different than the number of FL subframes; and
   transmitting the RL subframes to the SAN via a reverse link of the satellite communication system, wherein the last subframe of the communication frame is a RL subframe including hybrid automatic repeat request (HARQ) feedback information for a plurality of FL subframes previously received from the SAN.

40. The non-transitory computer-readable medium of claim 39, wherein execution of the instructions further causes the user terminal to:
   determine which of the RL subframes is to include the HARQ feedback information for a plurality of FL subframes based at least in part on radio resource configuration (RRC) information received from the SAN.

41. The non-transitory computer-readable medium of claim 39, wherein the last subframe of the communication frame includes HARQ feedback information for one or more FL subframes of a previous communication frame.

42. The non-transitory computer-readable medium of claim 39, wherein execution of the instructions further causes the user terminal to:
   select one of the RL subframes to include feedback information for a plurality of FL subframes based at least in part on a location of the user terminal relative to a satellite of the satellite communication system or a delay associated with the user terminal in switching between communications on the forward link and the reverse link.

* * * * *